US010466613B2

(12) United States Patent
Kondo et al.

(10) Patent No.: US 10,466,613 B2
(45) Date of Patent: Nov. 5, 2019

(54) LIGHT-EMITTING DEVICE, IMAGE FORMING APPARATUS, AND LIGHT IRRADIATION APPARATUS

(71) Applicant: FUJI XEROX CO.,LTD., Tokyo (JP)

(72) Inventors: Takashi Kondo, Kanagawa (JP); Seiji Ono, Kanagawa (JP); Chikaho Ikeda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/912,571

(22) Filed: Mar. 6, 2018

(65) Prior Publication Data
US 2018/0259872 A1 Sep. 13, 2018

(30) Foreign Application Priority Data
Mar. 7, 2017 (JP) .................. 2017-042838

(51) Int. Cl.
G02B 26/10 (2006.01)
G03G 15/043 (2006.01)
G03G 15/04 (2006.01)
H05B 37/02 (2006.01)

(52) U.S. Cl.
CPC ........... *G03G 15/043* (2013.01); *G02B 26/10* (2013.01); *G03G 15/04036* (2013.01); *H05B 37/02* (2013.01)

(58) Field of Classification Search
CPC ............. G02B 26/10; G03G 15/04036; G03G 15/043; H05B 37/02
See application file for complete search history.

(56) References Cited

U.S. PATENT DOCUMENTS

| 5,451,977 A * | 9/1995 | Kusuda ............ B41J 2/45 257/21 |
| 7,948,004 B2 | 5/2011 | Suzuki |
| 8,193,714 B2 | 6/2012 | Ohno |
| 10,038,305 B2 * | 7/2018 | Kondo ............. G03G 15/04054 |
| 2009/0297223 A1 * | 12/2009 | Suzuki ............... G03G 15/326 399/221 |

FOREIGN PATENT DOCUMENTS

| JP | H01238962 | 9/1989 |
| JP | 2001308385 | 11/2001 |
| JP | 2009286048 | 12/2009 |
| JP | 2010115810 | 5/2010 |

* cited by examiner

*Primary Examiner* — Lamson D Nguyen
(74) *Attorney, Agent, or Firm* — JCIPRNET

(57) ABSTRACT

A light-emitting device includes multiple transfer elements, multiple setting elements, multiple light-emitting elements, and a controller. The transfer elements sequentially enter an on state. The setting elements are connected to the transfer elements. In response to the transfer elements entering the on state, the setting elements are allowed to enter an on state. Each of the light-emitting elements is connected to a corresponding one of the setting elements. In response to each of the setting elements entering the on state, the corresponding one of the light-emitting elements enters an on state to emit light or increase a light emission intensity thereof. The light-emitting elements are maintained in the on state in parallel. The controller controls the setting elements to enter the on state in accordance with a received illumination control signal, and controls an illumination period of the light-emitting elements.

16 Claims, 13 Drawing Sheets

LIGHT-EMITTING DEVICE, IMAGE FORMING APPARATUS, AND LIGHT IRRADIATION APPARATUS

CROSS-REFERENCE TO RELATED APPLICATIONS

This application is based on and claims priority under 35 USC 119 from Japanese Patent Application No. 2017-042838 filed Mar. 7, 2017.

BACKGROUND

Technical Field

The present invention relates to a light-emitting device, an image forming apparatus, and a light irradiation apparatus.

SUMMARY

According to an aspect of the invention, there is provided a light-emitting device including multiple transfer elements, multiple setting elements, multiple light-emitting elements, and a controller. The multiple transfer elements sequentially enter an on state. The multiple setting elements are connected to the multiple transfer elements. In response to the multiple transfer elements entering the on state, the multiple setting elements are allowed to enter an on state. Each of the multiple light-emitting elements is connected to a corresponding one of the multiple setting elements. In response to each of the multiple setting elements entering the on state, the corresponding one of the multiple light-emitting elements enters an on state to emit light or increase a light emission intensity thereof. The multiple light-emitting elements are maintained in the on state in parallel. The controller controls the multiple setting elements to enter the on state in accordance with a received illumination control signal, and controls an illumination period of the multiple light-emitting elements.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail hereinafter with reference to the accompanying drawings.

In the following, a description will be given, taking as an example an image forming apparatus that forms an image on a recording sheet. Examples of the image forming apparatus include apparatuses configured to form an image, such as a projector that projects and forms an image, and a three-dimensional (3D) printer. In a 3D printer, a material that reacts with light is irradiated with light to form images which are overlaid on one another in layers to produce a three-dimensional object.

First Exemplary Embodiment

Image Forming Apparatus 1

Figure 1:
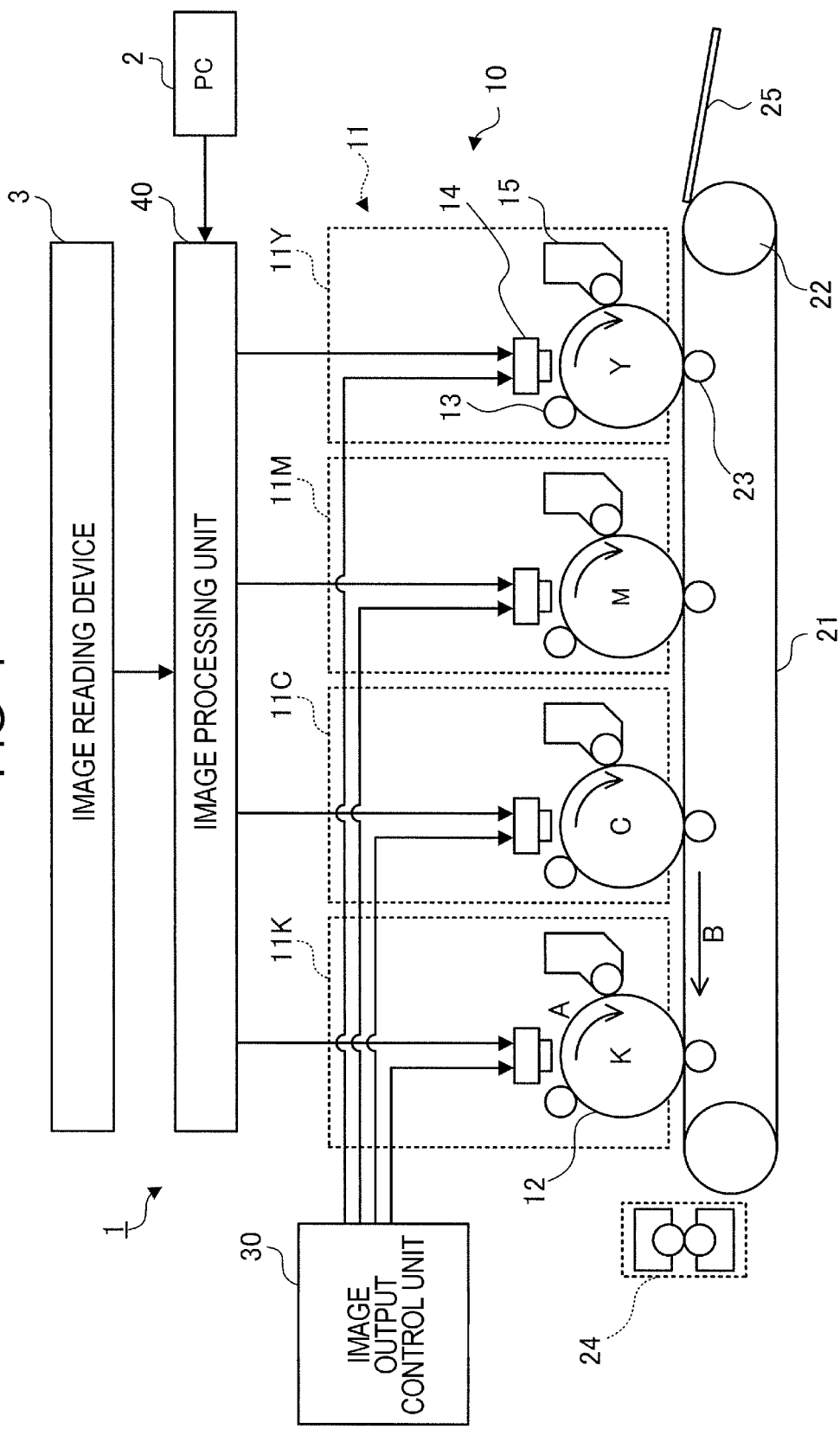
FIG. 1 illustrates an example overall configuration of an image forming apparatus according to a first exemplary embodiment.

FIG. 1 illustrates an example overall configuration of an image forming apparatus 1 according to a first exemplary embodiment. The image forming apparatus 1 illustrated in FIG. 1 is a so-called tandem image forming apparatus. The image forming apparatus 1 includes an image forming process unit 10, an image output control unit 30, and an image processing unit 40. The image forming process unit 10 forms an image in accordance with gradation data of respective colors. The image output control unit 30 controls the image forming process unit 10. The image processing unit 40 is connected to, for example, a personal computer (PC) 2 and an image reading device 3 and performs predetermined image processing on image data received from the PC 2 or the image reading device 3.

The image forming process unit 10 includes image forming units 11Y, 11M, 11C, and 11K, which are arranged in parallel with a predetermined space therebetween. The image forming units 11Y, 11M, 11C, and 11K are referred to collectively as the image forming units 11 or individually as an image forming unit 11 unless they are individually identified. Each of the image forming units 11 includes a photoconductor drum 12, a charger 13, a print head 14, and a developing device 15. The photoconductor drum 12 is an example of an image carrier that carries a toner image that is formed by visualizing an electrostatic latent image. The charger 13 is an example of a charging unit that charges a surface of the photoconductor drum 12 to a predetermined potential. The print head 14 is an example of an exposure unit that exposes the photoconductor drum 12 charged by the charger 13 to light. The developing device 15 is an example of a developing unit that develops an electrostatic latent image obtained by the print head 14. The image forming units 11Y, 11M, 11C, and 11K respectively form toner images of yellow (Y), magenta (M), cyan (C), and black (K).

The image forming process unit 10 further includes a sheet transport belt 21, drive rollers 22, transfer rollers 23, and a fixing device 24. The sheet transport belt 21 transports a recording sheet 25 to transfer the toner images of the respective colors, which are formed on the respective photoconductor drums 12 of the image forming units 11Y, 11M, 11C, and 11K, onto the recording sheet 25 so that the toner images are overlaid on one another. The recording sheet 25 is an example of a transfer medium. The sheet transport belt 21 is driven by the drive rollers 22. The transfer rollers 23 are an example of a transfer unit that transfers the toner images on the photoconductor drums 12 onto the recording sheet 25. The fixing device 24 fixes the toner images onto the recording sheet 25.

In the image forming apparatus 1, the image forming process unit 10 performs an image forming operation on the basis of various control signals supplied from the image output control unit 30. Under control of the image output control unit 30, the image processing unit 40 performs image processing on image data received from the PC 2 or the image reading device 3 and supplies the resulting image data to the image forming units 11. For example, in the image forming unit 11K of black (K), the photoconductor drum 12 is charged to a predetermined potential by the charger 13 while rotating in a direction indicated by arrow A, and is exposed to light by the print head 14 that emits light on the basis of the image data supplied from the image processing unit 40. Accordingly, an electrostatic latent image for a black (K) image is formed on the photoconductor drum 12. The electrostatic latent image on the photoconductor drum 12 is then developed by the developing device 15 and, as a result, a toner image of black (K) is formed on the photoconductor drum 12.

Also in the image forming units 11Y, 11M, and 11C, toner images of yellow (Y), magenta (M), and cyan (C) are formed respectively.

The toner images of the respective colors, which are formed on the photoconductor drums 12 in the image forming units 11, are sequentially transferred electrostatically onto the recording sheet 25 supplied in accordance with the movement of the sheet transport belt 21 that moves in a direction indicated by arrow B, by making an electric field for transfer, which is applied to the transfer rollers 23, act on the recording sheet 25. Accordingly, the toner images of the respective colors are superimposed on one another on the recording sheet 25 to form a composite toner image.

After that, the recording sheet 25 having an electrostatically transferred composite toner image is transported to the fixing device 24. The composite toner image on the recording sheet 25, which is transported to the fixing device 24, undergoes a fixing process with heat and pressure and is accordingly fixed onto the recording sheet 25 by the fixing device 24. The recording sheet 25 is then discharged from the image forming apparatus 1.

Print Head 14

Figure 2:
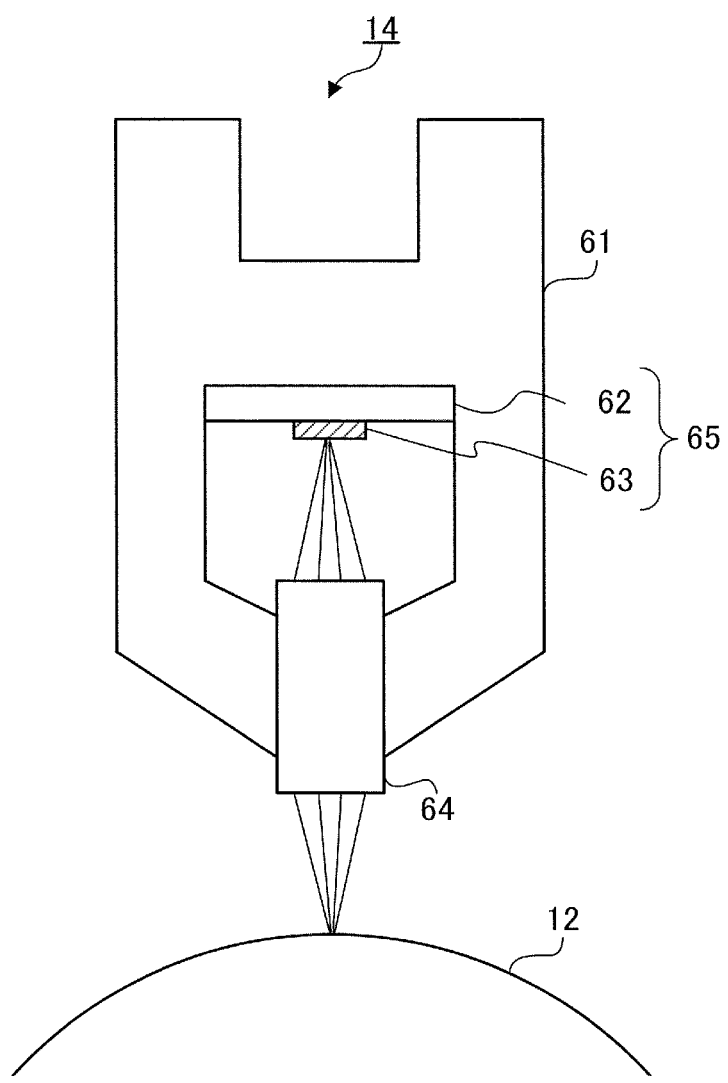
FIG. 2 is a cross-sectional view illustrating an example configuration of a print head.

FIG. 2 is a cross-sectional view illustrating an example configuration of the print head 14. The print head 14 includes a housing 61, a light-emitting device 65, and a rod lens array 64. The light-emitting device 65 includes a light source unit 63, and the light source unit 63 includes multiple light-emitting thyristors that expose the photoconductor drum 12 to light. The rod lens array 64 is an example of an optical unit that focuses light emitted from the light source unit 63 onto the surface of the photoconductor drum 12 to form an image on the surface of the photoconductor drum 12.

The light-emitting device 65 further includes a circuit board 62 on which the light source unit 63 described above, a signal generation circuit 110 (see FIG. 3, described below) that drives the light source unit 63, and so on are mounted. The signal generation circuit 110 may be mounted on any other circuit board. In the illustrated example, the signal generation circuit 110 is mounted on the circuit board 62.

The housing 61 is formed of metal, for example. The housing 61 supports the circuit board 62 and the rod lens array 64 and is set so that light-emitting surfaces of the light-emitting thyristors of the light source unit 63 match the focal plane of the rod lens array 64. The rod lens array 64 is arranged along the axis of the photoconductor drum 12 (i.e., in a main scanning direction, or an X direction in FIG. 3, described below).

Light-Emitting Device 65

Figure 3:
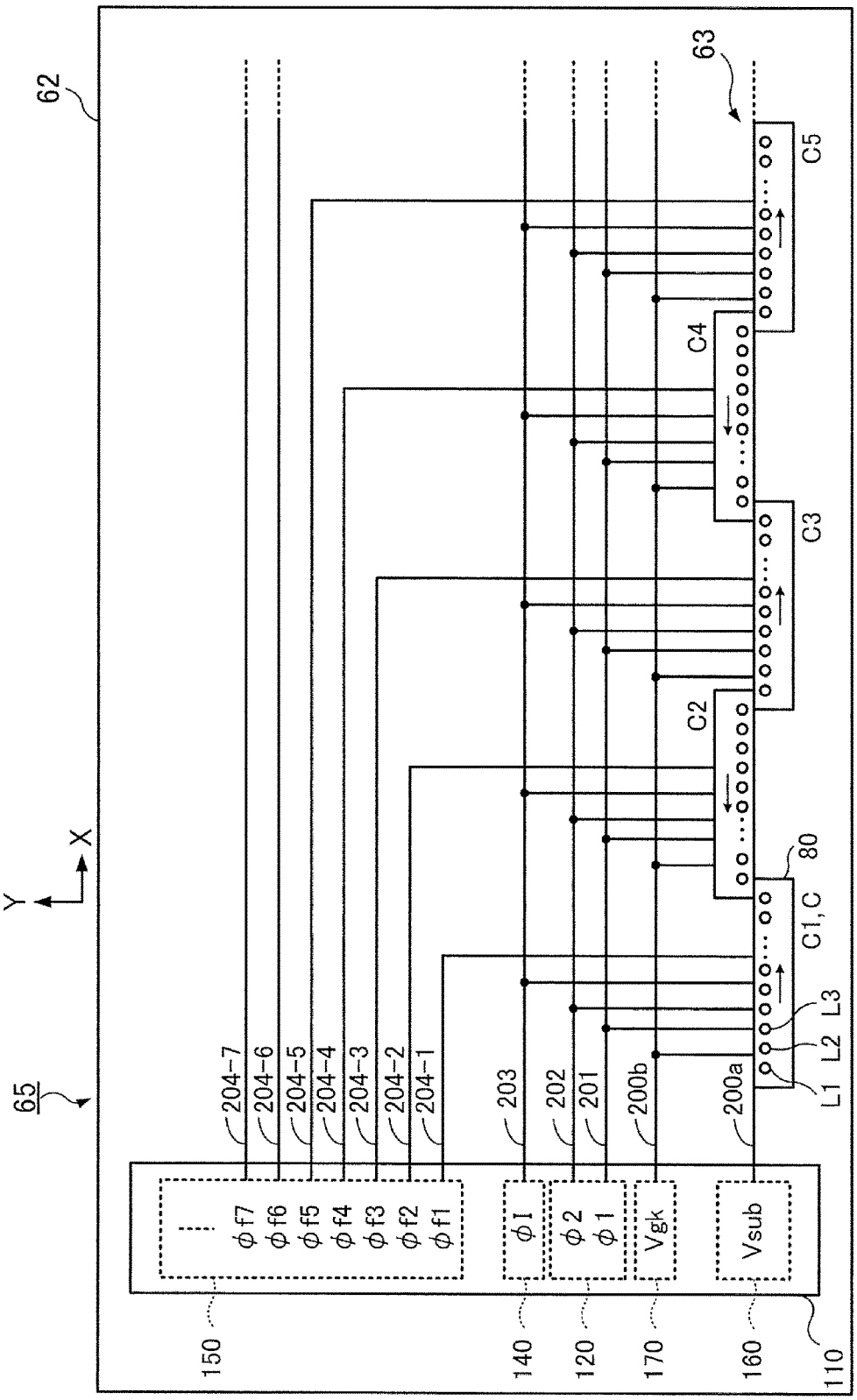
FIG. 3 is a top view of an exemplary light-emitting device according to the first exemplary embodiment.

FIG. 3 is a top view of an example of the light-emitting device 65 according to the first exemplary embodiment.

In the light-emitting device 65 illustrated in FIG. 3 by way of example, the light source unit 63 includes light-emitting chips C1, C2, C3, etc. The light-emitting chips C1, C2, C3, etc. are an example of a light-emitting unit and are arranged on the circuit board 62 in two rows in a staggered fashion in the X direction, which is the main scanning direction. The light-emitting chips C1, C2, C3, etc. are referred to collectively as the light-emitting chips C or individually as a light-emitting chip C unless they are individually identified. The light-emitting chips C1, C2, C3, etc. may have the same configuration.

The number of light-emitting chips C may be a predetermined value such as 40. In FIG. 3, the light-emitting chips C1 to C5 are illustrated.

The term "A to B", where A and B are numbers, as used herein, is used to indicate multiple elements that are individually identified with values ranging from A to B, both inclusive. As a specific example, the light-emitting chips C1 to C5 include the light-emitting chip C1, the light-emitting chip C2, the light-emitting chip C3, the light-emitting chip C4, and the light-emitting chip C5.

The light-emitting device 65 includes the signal generation circuit 110. The signal generation circuit 110 is an example of a controller that generates a signal for driving the light source unit 63. The signal generation circuit 110 is constituted by an integrated circuit (IC), for example. In the illustrated example, the signal generation circuit 110 is mounted on the circuit board 62. However, the signal generation circuit 110 may not necessarily be mounted on the circuit board 62. The signal generation circuit 110, which is not mounted on the circuit board 62, is disposed outside the circuit board 62 and supplies a signal for driving the light source unit 63 (such as an illumination signal ϕI, described below) to the circuit board 62 via a cable or the like. The signal generation circuit 110 is described here as being mounted on the circuit board 62.

The arrangement of the light-emitting chips C will be described in detail below.

Each of the light-emitting chips C includes a substrate 80 having rectangular front and back surfaces, and multiple light-emitting thyristors L1, L2, L3, etc. On the front surface of the substrate 80, the light-emitting thyristors L1, L2, L3, etc. are arranged in a row along long sides of the substrate 80 to be positioned closer to one of the long sides. The multiple light-emitting thyristors L1, L2, L3, etc. are referred to collectively as the light-emitting thyristors L or individually as a light-emitting thyristor L unless they are individually identified. Each of the light-emitting thyristors L is an example of a light-emitting element. The number of light-emitting thyristors L may be a predetermined value such as 128.

The light-emitting chip C further includes, on the substrate 80, multiple terminals (not illustrated) (φ1, φ2, Vgk, φ1, and φf terminals illustrated in FIG. 4, described below) for receiving signals for driving the light-emitting chip C. The multiple terminals are bonding pads. The light-emitting chip C further includes a back-surface electrode, which is a Vsub terminal, on the back surface of the substrate 80.

The term "arranging multiple light-emitting elements in a row" is used to indicate not only the arrangement of multiple light-emitting elements in a straight line, as on the light-emitting chip C illustrated in FIG. 3, but also the arrangement of multiple light-emitting elements with different displacements in a direction perpendicular to the direction of the row. For example, when the light-emitting surfaces of the light-emitting elements are each denoted by a pixel, each of the light-emitting elements may be arranged with a displacement of several pixels or several tens of pixels in a direction perpendicular to the direction of the row. Alternatively, adjacent light-emitting elements may be arranged in an alternate zigzag fashion or groups, each including multiple light-emitting elements, may be arranged in a zigzag fashion.

The arrangement of the light-emitting chips C1, C2, C3, etc. is now described.

The odd-numbered light-emitting chips C1, C3, C5, etc. are arranged in one row with a predetermined space therebetween in the longitudinal direction of the respective substrates 80. The even-numbered light-emitting chips C2, C4, etc. are also arranged in one row with a predetermined space therebetween in the longitudinal direction of the respective substrates 80. The odd-numbered light-emitting chips C1, C3, C5, etc. and the even-numbered light-emitting chips C2, C4, etc. are arranged in a staggered fashion with being rotated 180° to each other in such a manner that the long sides of the light-emitting chips C to which the light-emitting thyristors L are positioned closer face each other. In addition, on each of the light-emitting chips C, the positions of the light-emitting thyristors L are set so that the light-emitting thyristors L are arranged side-by-side with a predetermined space therebetween in the main scanning direction (X direction). In each of the light-emitting chips C1, C2, C3, etc., the direction of arrangement of the light-emitting thyristors L (the order in which the light-emitting thyristors L1, L2, L3, etc. are numbered) is indicated by an arrow.

The multiple terminals (the φ1, φ2, Vgk, φI, and φf terminals illustrated in FIG. 4, described below) may be disposed separately outside the light-emitting thyristors L in the longitudinal direction of the substrates 80 of the light-emitting chips C or may be disposed on each of the substrates 80 of the light-emitting chips C along one of the long sides thereof opposite the long side along which the light-emitting thyristors L are located.

Next, the configuration of the signal generation circuit 110 of the light-emitting device 65 and the configuration of wiring (lines) on the circuit board 62 will be described.

As described above, the circuit board 62 of the light-emitting device 65 has the signal generation circuit 110 and the light-emitting chips C1, C2, C3, etc., and also has wiring (lines) that connects the signal generation circuit 110 and the light-emitting chips C1, C2, C3, etc.

First, a description will be given of the configuration of the signal generation circuit 110.

The signal generation circuit 110 receives various control signals and image data obtained through image processing from the image output control unit 30 and the image processing unit 40 (see FIG. 1). The image data and the various control signals are referred to as illumination control signals. The signal generation circuit 110 performs operations, such as rearranging pieces of image data and correcting an amount of light, on the basis of the illumination control signals to generate signals for driving the light-emitting chips C.

The signal generation circuit 110 includes a transfer signal generation unit 120. The transfer signal generation unit 120 generates transfer signals φ1 and φ2 on the basis of the illumination control signals and transmits the transfer signals φ1 and φ2 to the light-emitting chips C1, C2, C3, etc. in common.

The signal generation circuit 110 further includes an illumination signal generation unit 140. The illumination signal generation unit 140 generates an illumination signal φ1 on the basis of the illumination control signals and transmits the illumination signal φI to the light-emitting chips C1, C2, C3, etc. in common.

The signal generation circuit 110 further includes a setting signal generation unit 150. The setting signal generation unit 150 generates setting signals φf1, φf2, φf3, etc. for setting the light-emitting thyristors L on the light-emitting chips C1, C2, C3, etc., respectively, to an illuminated state (a light-emitting state) or a non-illuminated state (an extinguished state) (illuminated state/non-illuminated state) on the basis of the illumination control signals and transmits the setting signals φf1, φf2, and φf3, etc. to the light-emitting chips C1, C2, C3, etc., respectively. The setting signals φf1, φf2, φf3, etc. are referred to collectively as the setting signals φf individually as a setting signal of unless they are individually identified.

The signal generation circuit 110 further includes a reference potential supply unit 160 and a power supply potential supply unit 170. The reference potential supply unit 160 supplies a reference potential Vsub, which is used as a reference for potential, to the light-emitting chips C1, C2, C3, etc. The power supply potential supply unit 170 supplies a power supply potential Vgk for driving the light-emitting chips C1, C2, C3, etc.

Next, a description will be given of the wiring (lines) that connects the signal generation circuit 110 and the light-emitting chips C1, C2, C3, etc.

The circuit board 62 has a power supply line 200a. The power supply line 200a is connected to the back-surface electrodes on the substrates 80 of the light-emitting chips C, namely, the Vsub terminals (see FIG. 4 described below), and supplies the reference potential Vsub.

The circuit board 62 further has a power supply line 200b. The power supply line 200b is connected to the Vgk terminals (see FIG. 4 described below) disposed on the respective light-emitting chips C and supplies the power supply potential Vgk for driving.

The circuit board 62 further has a transfer signal line 201 and a transfer signal line 202. The transfer signal line 201 is used to transmit the transfer signal φ1 from the transfer signal generation unit 120 of the signal generation circuit 110 to the φ1 terminals (see FIG. 4 described below) on the respective light-emitting chips C. The transfer signal line 202 is used to transmit the transfer signal φ2 from the transfer signal generation unit 120 to the φ2 terminals (see FIG. 4 described below) on the respective light-emitting chips C. The transfer signals φ1 and φ2 are transmitted to the light-emitting chips C in common (or in parallel).

The circuit board 62 further has an illumination signal line 203. The illumination signal line 203 is used to transmit the illumination signal φI from the illumination signal generation unit 140 of the signal generation circuit 110 to the φI terminals (see FIG. 4 described below) on the respective light-emitting chips C.

The circuit board 62 further has setting signal lines 204-1, 204-2, 204-3, etc. The setting signal lines 204-1, 204-2, 204-3, etc. are used to transmit the setting signals φf1, φf2, φf3, etc. from the setting signal generation unit 150 of the signal generation circuit 110 to the φf terminals (see FIG. 4 described below) on the light-emitting chips C1, C2, C3, etc., respectively. The setting signal lines 204-1, 204-2, 204-3, etc. are referred to collectively as the setting signal lines 204 or individually as a setting signal line 204 unless they are individually identified.

As described above, the reference potential Vsub and the power supply potential Vgk are supplied to the light-emitting chips C on the circuit board 62 in common. The transfer signals φ1 and φ2 and the illumination signal φI are transmitted to the light-emitting chips C in common (or in parallel). In contrast, the setting signals φf1, φf2, φf3, etc. are individually transmitted to the light-emitting chips C1, C2, C3, etc., respectively.

Light-Emitting Chip C

Figure 4:
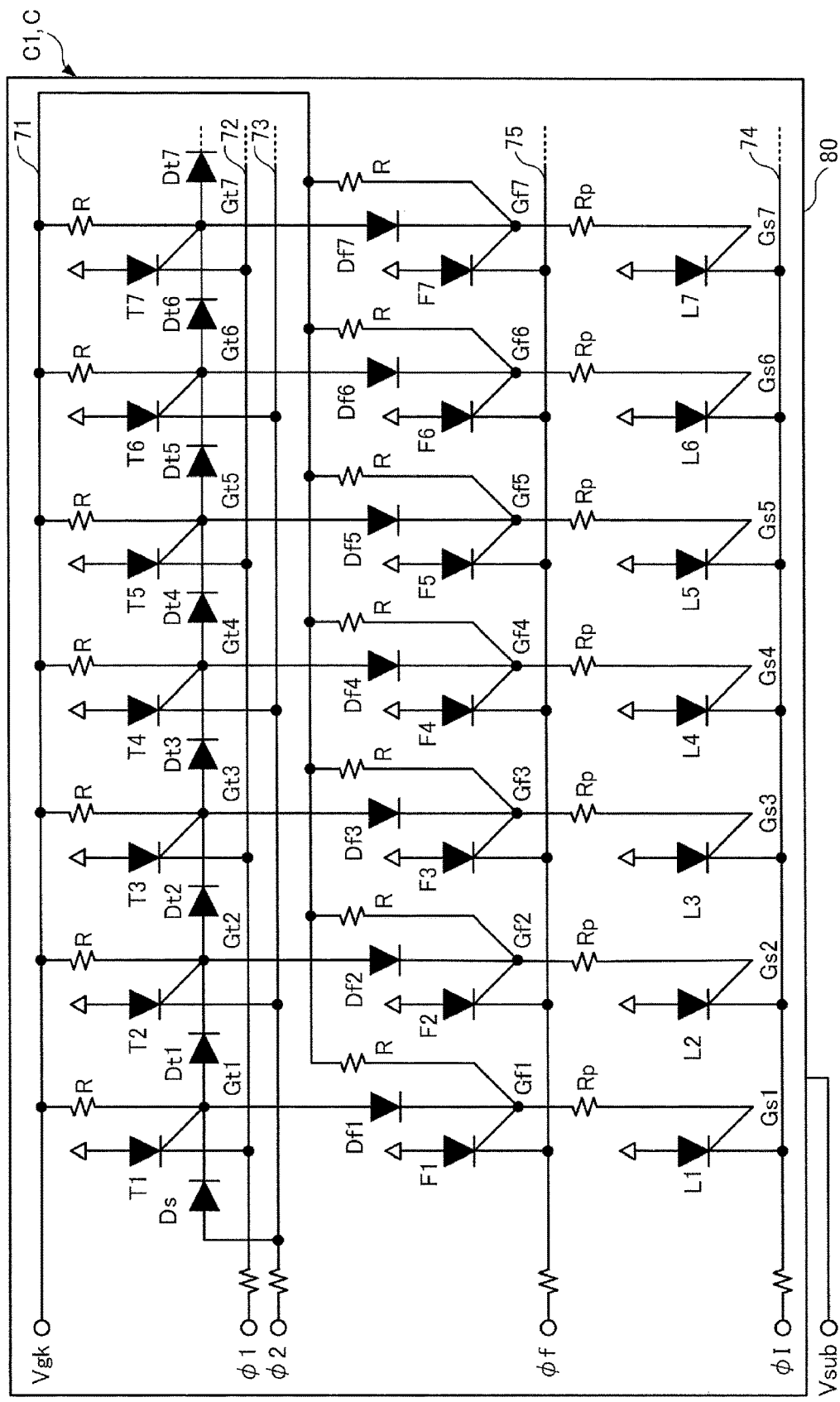
FIG. 4 is an equivalent circuit diagram illustrating a circuit configuration of a light-emitting chip having a self-scanning light-emitting device (SLED) array according to the first exemplary embodiment.

FIG. 4 is an equivalent circuit diagram illustrating a circuit configuration of a light-emitting chip C having a self-scanning light-emitting device (SLED) array according to the first exemplary embodiment. In FIG. 4, the terminals (the φ1, φ2, Vgk, φI, and φf terminals) are depicted in a left end portion to illustrate a connection relationship with the signal generation circuit 110. The Vsub terminal, which is a back-surface electrode on the substrate 80, is depicted as being led outside the substrate 80.

The light-emitting chip C will now be described, taking the light-emitting chip C1 as an example in terms of the relationship with the signal generation circuit 110. In the following, the light-emitting chip C is represented by the light-emitting chip C1(C), which is equivalent to "C1, C" in FIG. 4. The other light-emitting chips C have the same or substantially the same configuration as the light-emitting chip C1(C).

The light-emitting chip C1(C) includes the light-emitting thyristors L1, L2, L3, etc. on the substrate 80.

The light-emitting chip C1(C) includes transfer thyristors T1, T2, T3, etc., which are arranged in a row in a manner similar to that of the light-emitting thyristors L1, L2, L3, etc. The transfer thyristors T1, T2, T3, etc. are referred to collectively as the transfer thyristors T or individually as a transfer thyristor T unless they are individually identified. The light-emitting chip C1(C) further includes coupling diodes Dt1, Dt2, Dt3, etc., each of which is disposed between a pair of transfer thyristors when the transfer thyristors T1, T2, T3, etc. are paired in numbered order. The coupling diodes Dt1, Dt2, Dt3, etc. are referred to collectively as the coupling diodes Dt or individually as a coupling diode Dt unless they are individually identified. The light-emitting chip C1(C) further includes power-supply-line resistors R, each of which is disposed between a power supply line 71 described below and one of the transfer thyristors T1, T2, T3, etc. The light-emitting chip C1(C) further includes a start diode Ds.

The description is given here with each of the transfer thyristors T as an example of a transfer element. Alternatively, as described below, other circuit elements that sequentially enter an on state may be used. For example, a shift register or a circuit element including a combination of multiple transistors may be used.

The light-emitting chip C1(C) further includes setting thyristors F1, F2, F3, etc., which are arranged in a row in a manner similar to that of the light-emitting thyristors L1, L2, L3, etc. and the transfer thyristors T1, T2, T3, etc. The setting thyristors F1, F2, F3, etc. are referred to collectively as the setting thyristors F or individually as a setting thyristor F unless they are individually identified. Each of the setting thyristors F is an example of a setting element. The light-emitting chip C1(C) further includes connection diodes Df1, Df2, Df3, etc. in association with the setting thyristors F1, F2, F3, etc., respectively. The light-emitting chip C1(C) further includes resistors Rp, each of which is disposed between one of the light-emitting thyristors L1, L2, L3, etc. and the corresponding one of the setting thyristors F1, F2, F3, etc. Each of the power-supply-line resistors R is disposed between the power supply line 71, described below, and one of the setting thyristors F1, F2, F3, etc.

On the light-emitting chip C1(C), the number of light-emitting thyristors L, the number of transfer thyristors T, the number of setting thyristors F, and the number of connection diodes Df are identical and are 128, for example. The number of coupling diodes Dt is one smaller than the number of transfer thyristors T and so on and is 127, for example.

In FIG. 4, the light-emitting thyristors L1 to L7, the transfer thyristors T1 to T7, the coupling diodes Dt1 to Dt7, the start diode Ds, the setting thyristors F1 to F7, and the connection diodes Df1 to Df7 are illustrated.

The light-emitting thyristors L, the transfer thyristors T, and the setting thyristors F have a pnpn structure in which p-type semiconductor layers and n-type semiconductor layers composed of compound semiconductor such as GaAs, GaAlAs, or AlAs (compound semiconductor layers) are stacked on the substrate 80, which is also composed of compound semiconductor. The light-emitting thyristors L, the transfer thyristors T, and the setting thyristors F are each a three-terminal element having an anode, a cathode, and a gate.

Each of the light-emitting thyristors L changes from an off state in which current flowing between the anode and the cathode is small to an on state in which current flowing between the anode and the cathode is large, thereby illuminating (emitting light) (entering the illuminated state).

The coupling diodes Dt and the connection diodes Df are each a two-terminal element having an anode and a cathode. The coupling diodes Dt and the connection diodes Df are formed by using part of the compound semiconductor layers that form the light-emitting thyristors L, the transfer thyristors T, and the setting thyristors F.

The power-supply-line resistors R are formed by using part of the compound semiconductor layers that form the light-emitting thyristors L, the transfer thyristors T, and the setting thyristors F, with the compound semiconductor layers being used as resistors.

Each of the resistors Rp may be a resistor across which a potential drop occurs, and is assumed here to be a parasitic resistor. However, the resistors Rp may be formed by using the compound semiconductor layers in a way similar to that of the power-supply-line resistors R.

The anodes, cathodes, and gates of the light-emitting thyristors L, the transfer thyristors T, and the setting thyristors F and the anodes and cathodes of the coupling diodes Dt and the connection diodes Df are denoted using the corresponding signs in FIG. 4.

A description will now be given of the connection relationship, with the i-th light-emitting thyristor L, the i-th transfer thyristor T, and the i-th setting thyristor F from the leftmost ones in FIG. 4 being represented by the light-emitting thyristor $L_i$, the transfer thyristor $T_i$, and the setting thyristor $F_i$, respectively, where i is an integer greater than or equal to 1. The same applies to the coupling diodes Dt, the connection diodes Df, and so on. In the description, unlike the case where numbers are expressed in digits, when numbers are represented using i, the numbers as well as i are expressed as subscripts.

The gate $Gt_i$ of the transfer thyristor $T_i$ is connected to the gate $Gt_{i+1}$ of the adjacent transfer thyristor $T_{i+1}$ via the coupling diode $Dt_i$. The coupling diode $Dt_i$ is connected in a direction in which current flows from the gate $Gt_i$ to the gate $Gt_{i+1}$.

The gate $Gt_i$ of the transfer thyristor $T_i$ is connected to the anode of the connection diode $Df_i$. The cathode of the connection diode $Df_i$ is connected to the gate $Gf_i$ of the setting thyristor $F_i$. The gate $Gf_i$ of the setting thyristor $F_i$ is connected to the gate $Gs_i$ of the light-emitting thyristor $L_i$ via the corresponding resistor Rp.

The gate $Gt_i$ of the transfer thyristor $T_i$ and the gate $Gf_i$ of the setting thyristor $F_i$ are connected to the power supply line 71 via the corresponding power-supply-line resistor R.

The cathode of the odd-numbered transfer thyristor $T_{2i-1}$ is connected to a transfer signal line 72.

The cathode of the even-numbered transfer thyristor $T_{2i}$ is connected to a transfer signal line 73.

The cathode of the setting thyristor $F_i$ is connected to a setting signal line 75.

The cathode of the light-emitting thyristor $L_i$ is connected to an illumination signal line 74.

The start diode Ds has an anode connected to the transfer signal line 73, and a cathode connected to the gate Gt1 of the transfer thyristor T1.

The anodes of the light-emitting thyristor $L_i$, the transfer thyristor $T_i$, and the setting thyristor $F_i$ are connected to the Vsub terminal via a back-surface electrode on the substrate 80.

The transfer signal lines 72 and 73, the illumination signal line 74, and the setting signal line 75 are respectively connected to the φ1 terminal, the φ2 terminal, the φI terminal, and the φf terminal via respective current-limiting resistors. The current-limiting resistors may be disposed outside the light-emitting chip C1(C). For example, the current-limiting resistor in the illumination signal line 74 may be disposed outside the light-emitting chip C1(C).

As described above, the φ1 terminal, the φ2 terminal, the φI terminal, and the φf terminal are respectively supplied with the transfer signal φ1, the transfer signal φ2, the illumination signal φI, and the setting signal φf (in the case of the light-emitting chip C1, the setting signal φf1).

The Vgk terminal is supplied with the power supply potential Vgk, and the Vsub terminal is supplied with the reference potential Vsub.

Basic Operation of Thyristor

The basic operation of a thyristor (a light-emitting thyristor L, a transfer thyristor T, and a setting thyristor F) will be described. As described above, the thyristor has a pnpn structure including p-type semiconductor layers and n-type semiconductor layers composed of, for example, GaAs, GaAlAs, or AlAs. A description is given here on the assumption that a forward voltage (diffusion potential) Vd of a pn junction having a p-type semiconductor layer and an n-type semiconductor layer is 1.4 V, by way of example.

In the following description, as an example, the reference potential Vsub supplied to the Vsub terminal, which is a back-surface electrode on the substrate 80, is 0 V as a high-level potential (hereinafter represented by "H") (in this case, sometimes represented by "H" (0 V)), and the power supply potential Vgk supplied to the Vgk terminal is −3.3 V as a low-level potential (hereinafter represented by "L") (in this case, sometimes represented by "L" (−3.3 V)).

The anode of the thyristor has a potential equal to the reference potential Vsub ("H" (0 V)), which is supplied to the back-surface electrode.

When a potential lower than (a negative potential whose absolute value is larger than) an on-voltage Von (threshold voltage) is applied to the cathode of the thyristor in an off state in which current flowing between the anode and the cathode is small, the thyristor changes from the off state to an on state in which current flowing between the anode and the cathode is large ("turn-on"). The on-voltage Von has a value given by subtracting the forward voltage Vd (1.4 V) of the pn junction from the potential of the gate (gate potential Vg) (Von=Vg−Vd).

When the thyristor enters the on state, the gate has a potential close to the potential of the anode. It is assumed here that the anode is set to the reference potential Vsub ("H" (0 V)). Thus, the gate is assumed to be set to 0 V ("H" (0 V)). The cathode has a potential close to a potential given by subtracting the forward voltage Vd (1.4 V) of the pn junction from the potential of the anode. Since the anode is set to the reference potential Vsub ("H" (0 V)) here, the cathode of the thyristor in the on state is set to a potential close to −1.4 V (a negative potential whose absolute value is larger than 1.4 V). The potential of the cathode is set in accordance with the relationship with a power supply that supplies current to the thyristor in the on state.

When the cathode of the thyristor in the on state is set to a potential higher than (a negative potential whose absolute value is smaller than) a potential necessary to maintain the on state (the potential close to −1.4 V described above) (or is set to 0 V or a positive potential), the thyristor changes to the off state ("turn-off").

In contrast, when a maintenance voltage having a potential lower than (a negative potential whose absolute value is larger than) the potential necessary to maintain the on state is continuously applied to the cathode of the thyristor in the on state and current that allows the thyristor to be maintained in the on state (maintenance current) is supplied to the cathode of the thyristor, the thyristor remains in the on state.

Operation of Light-Emitting Chip C

Figure 5:
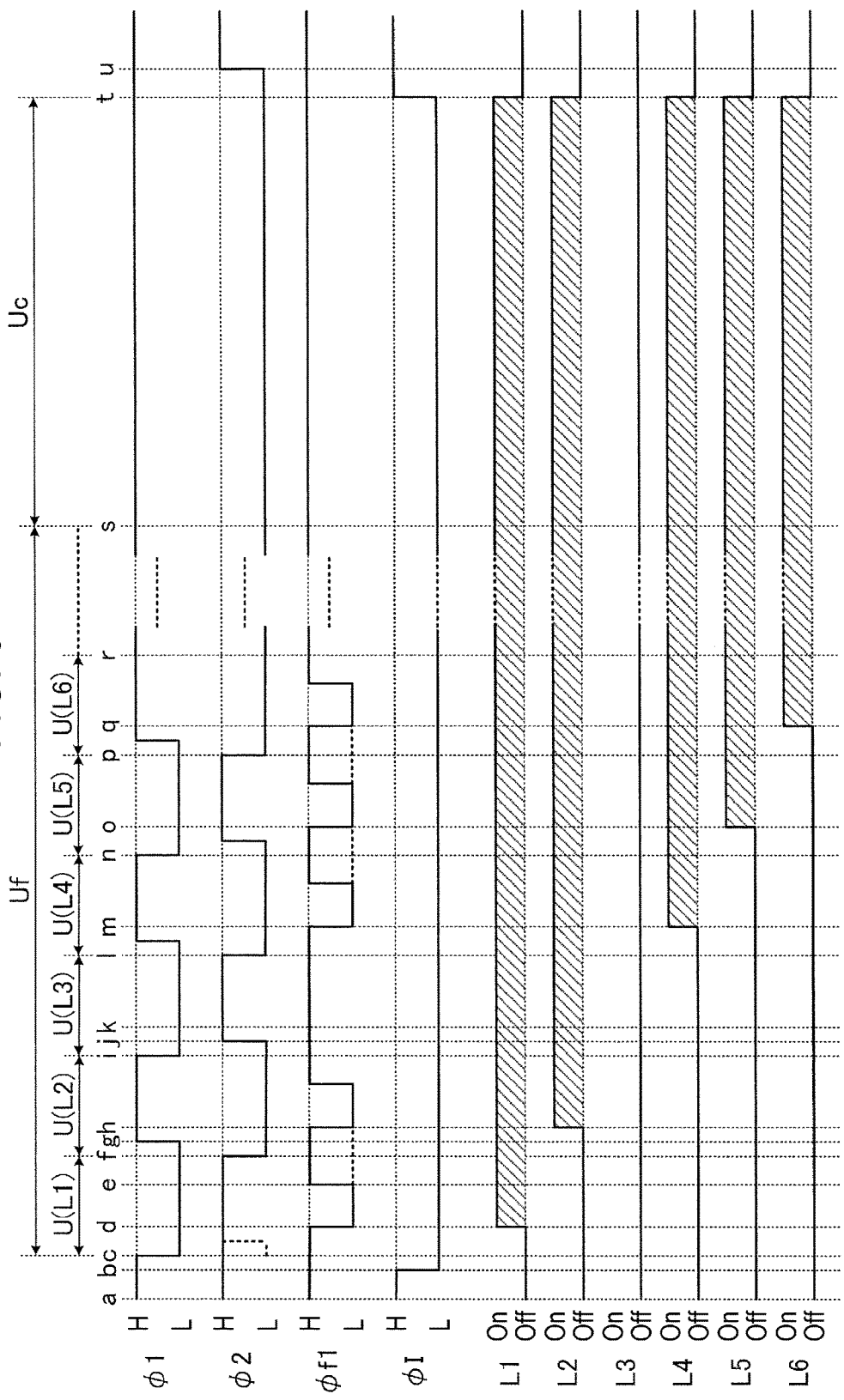
FIG. 5 is a timing chart illustrating the operation of the light-emitting chip according to the first exemplary embodiment.

FIG. 5 is a timing chart illustrating the operation of the light-emitting chip C according to the first exemplary embodiment.

In the timing chart illustrated in FIG. 5, time passes in alphabetical order (in the order of times a, b, c, etc.).

Periods U(L1), U(L2), U(L3), etc. are periods in which the light-emitting thyristors L1, L2, L3, etc. are respectively set to either the illuminated state or the non-illuminated state. The periods U(L1), U(L2), U(L3), etc. are referred to collectively as the periods U or individually as a period U unless they are individually identified. The sum of the periods U in which all of the light-emitting thyristors L are set to the illuminated state/non-illuminated state is represented as an illumination setting period Uf. The illumination setting period Uf is followed by a continuous illumination period Uc, which is a period in which the light-emitting thyristors L that are set to the illuminated state in the illumination setting period Uf are continuously in the illuminated state.

The period U(L1) starts at time c and ends at time f, the period U(L2) starts at time f and ends at time i, and the period U(L3) starts at time i and ends at time l. The start and end of the subsequent periods are also set in a similar manner. The illumination setting period Uf starts at time c and ends at time s. The continuous illumination period Uc starts at time s and ends at time t.

In the following, the operation of the light-emitting chip C will be described in order of times a, b, c, etc. with reference to FIGS. 3 and 4.

It is assumed here that, of the light-emitting thyristors L1 to L6, the light-emitting thyristors L1, L2, L4, L5, and L6 are set to the illuminated state and the light-emitting thyristor L3 is set to the non-illuminated state.

(1) Time a (Initial State)

At time a (the initial state), the power supply potential Vgk is set to "L" (−3.3 V) and the reference potential Vsub is set to "H" (0 V). Thus, the power supply potential Vgk ("L" (−3.3 V)) is supplied to the Vgk terminal via the power supply line 200b, and the reference potential Vsub ("H" (0 V)) is supplied to the Vsub terminal via the power supply line 200a.

Accordingly, the power supply line 71, which is connected to the Vgk terminal, is set to the power supply potential Vgk ("L" (−3.3 V)). The respective anodes of the transfer thyristors T, the light-emitting thyristors L, and the setting thyristors F, which are connected to the Vsub terminal via the substrate 80, are set to "H" (0 V).

At time a (the initial state), furthermore, the transfer signals ϕ1 and ϕ2, the illumination signal ϕI, and the setting signal ϕf1 are set to "H" (0 V). Thus, the transfer signal line 72 to which the transfer signal ϕ1 is supplied, the transfer signal line 73 to which the transfer signal ϕ2 is supplied, the illumination signal line 74 to which the illumination signal ϕI is supplied, and the setting signal line 75 to which the setting signal ϕf1 is supplied are set to "H" (0 V).

Accordingly, the cathodes of the odd-numbered transfer thyristors T, which are connected to the transfer signal ϕ1, the cathodes of the even-numbered transfer thyristors T, which are connected to the transfer signal line 73, the cathodes of the light-emitting thyristors L, which are connected to the illumination signal line 74, and the cathodes of the setting thyristors F, which are connected to the setting signal line 75 are set to "H" (0 V).

As described above, the respective anodes of the transfer thyristors T, the light-emitting thyristors L, and the setting thyristors F are also set to "H" (0 V). Thus, all of the transfer thyristors T, the light-emitting thyristors L, and the setting thyristors F are in the off state.

At this time, the gates Gt of the transfer thyristors T and the gates Gs of the light-emitting thyristors L are connected to the power supply line 71 ("L" (−3.3 V)) via the respective power-supply-line resistors R. The gates Gs of the light-emitting thyristors L are connected to the power supply line 71 via the respective power-supply-line resistors R and the respective resistors Rp.

However, the gate Gt1 of the transfer thyristor T1 is connected to the transfer signal line 73, which is set to "H" (0 V), via the start diode Ds.

The anode of the start diode Ds is set to "H" (0 V) and the cathode of the start diode Ds is connected to the power supply line 71, which is set to "L" (−3.3 V), via the power-supply-line resistor R. The start diode Ds is thus forward biased. Thus, the gate Gt1 of the transfer thyristor T1 is set to −1.4 V, which is equal to the forward voltage Vd of the start diode Ds. The on-voltage Von of the transfer thyristor T1 is therefore −2.8 V.

The gate Gt2 of the transfer thyristor T2, which is adjacent to the transfer thyristor T1, is connected to the power supply line 71 ("L" (−3.3 V)) via the power-supply-line resistor R and is also connected to the transfer signal line 73, which is set to "H" (0 V), via the coupling diode Dt1 and the start diode Ds. Thus, the gate Gt2 of the transfer thyristor T2 is set to −2.8 V due to the respective forward voltages Vd of the coupling diode Dt1 and the start diode Ds. The on-voltage Von of the transfer thyristor T2 is therefore −4.2 V.

It should be noted that the transfer thyristor T3 and the subsequent transfer thyristors are not affected by the connection of the anode of the start diode Ds to the transfer signal line 73, which is set to "H" (0 V). That is, the gate Gt3 of the transfer thyristor T3 is connected to the power supply line 71, which is set to "L" (−3.3 V), via the power-supply-line resistor R and is thus set to −3.3 V. The on-voltage Von of the transfer thyristor T3 is therefore −4.7 V. The same applies to the transfer thyristor T4 and the subsequent transfer thyristors.

The gate Gf1 of the setting thyristor F1 is connected to the power supply line 71 ("L" (−3.3 V)) via the power-supply-line resistor R and is also connected to the gate Gt1 of the transfer thyristor T1 via the connection diode Df1. Thus, the gate Gf1 of the setting thyristor F1 is set to −2.8 V due to the forward Vd of the connection diode Df1. The on-voltage Von of the setting thyristor F1 is therefore −4.2 V. The setting thyristor F2 and the subsequent setting thyristors are not affected by the connection of the anode of the start diode Ds to the transfer signal line 73, which is set to "H" (0 V). That is, the gate Gf2 of the setting thyristor F2 is connected to the power supply line 71, which is set to "L" (−3.3 V), via the power-supply-line resistor R and is thus set to −3.3 V. The on-voltage Von of the setting thyristor F2 is therefore −4.7 V. The same applies to the setting thyristor F3 and the subsequent setting thyristors.

The gate Gs1 of the light-emitting thyristor L1 is connected to the gate Gf1 of the setting thyristor F1 via the resistor Rp. Thus, the gate Gs1 of the light-emitting thyristor L1 is set to −2.8 V. The on-voltage Von of the light-emitting thyristor L1 is therefore −4.2 V. The light-emitting thyristor L2 and the subsequent light-emitting thyristors are not affected by the connection of the anode of the start diode Ds to the transfer signal line 73, which is set to "H" (0 V). That is, the gate Gs2 of the light-emitting thyristor L2 is connected to the gate Gf2 of the setting thyristor F2, which has a voltage of −3.3 V, via the resistor Rp and is thus set to −3.3 V. The on-voltage Von of the light-emitting thyristor L2 is therefore −4.7 V. The same applies to the light-emitting thyristor L3 and the subsequent light-emitting thyristors.

(2) Time b

At time b, the illumination signal ϕI changes from "H" (0 V) to "L" (−3.3 V). Accordingly, the illumination signal line 74 to which the illumination signal ϕI is supplied changes from "H" (0 V) to "L" (−3.3 V).

The cathodes of the light-emitting thyristors L are connected to the illumination signal line 74. However, since the light-emitting thyristor L1 has an on-voltage Von of −4.2 V and the light-emitting thyristor L2 and the subsequent light-emitting thyristors have an on-voltage Von of −4.7 V, none of the light-emitting thyristors L turns on.

(3) Time c

At time c, the transfer signal ϕ1 changes from "H" (0 V) to "L" (−3.3 V). Accordingly, the transfer signal line 72 to which the transfer signal ϕ1 is supplied changes from "H" (0 V) to "L" (−3.3 V).

The odd-numbered transfer thyristors T1, T3, T5, etc. are connected to the transfer signal line 72. Thus, when the transfer signal line 72 changes from "H" (0 V) to "L" (−3.3 V), the transfer thyristor T1 whose on-voltage Von is −2.8 V turns on and changes from the off state to the on state.

Then, the gate Gt1 of the transfer thyristor T1 is set to "H" (0 V) from −1.4 V, and the cathode of the transfer thyristor T1 has a potential close to −1.4 V. Accordingly, the transfer signal line 72 is set to a potential equal to that of the cathode of the transfer thyristor T1, i.e., the potential close to −1.4 V, from "L" (−3.3 V).

At time c, the odd-numbered transfer thyristors T3, T5, T7, etc. have an on-voltage Von of −4.7 V and thus do not turn on.

When the transfer thyristor T1 changes to the on state and the voltage of the gate Gt1 changes from −1.4 V to "H" (0 V), the gate Gt2 of the transfer thyristor T2, which is connected to the gate Gt1 of the transfer thyristor T1 via the coupling diode Dt1, is set to −1.4 V from −2.8 V. Accordingly, the on-voltage Von of the transfer thyristor T2 changes from −4.2 V to −2.8 V.

The gate Gt3 of the transfer thyristor T3, which is connected to the gate Gt2 of the transfer thyristor T2 via the coupling diode Dt2, is set to −2.8 V from −3.3 V. Accordingly, the on-voltage Von of the transfer thyristor T3 changes from −4.7 V to −4.2 V. The transfer thyristor T4 and the subsequent transfer thyristors are not affected by the change of the transfer thyristor T1 to the on state. Thus, the on-voltages Von of the transfer thyristor T4 and the subsequent transfer thyristors are maintained at −4.7 V.

At this time, the gate Gf1 of the setting thyristor F1 is connected to the gate Gt1 of the transfer thyristor T1, which is set to "H" (0 V), via the connection diode Df1. Thus, the gate Gf1 of the setting thyristor F1 is set to −1.4 V from −2.8 V. Accordingly, the on-voltage Von of the setting thyristor F1 becomes −2.8 V.

The gate Gf2 of the setting thyristor F2 is connected to the gate Gt2 of the transfer thyristor T2, which is set to −1.4 V, via the connection diode Df2. Thus, the gate Gf2 of the setting thyristor F2 is set to −2.8 V. Accordingly, the on-voltage Von of the setting thyristor F2 becomes −4.2 V. The setting thyristor F3 and the subsequent setting thyristors are not affected by the change of the transfer thyristor T1 to the on state. Thus, the on-voltages Von of the setting thyristor F3 and the subsequent setting thyristors are maintained at −4.7 V.

At time c, since the setting signal line 75 is set to "H" (0 V), none of the setting thyristors F turns on.

The gate Gs1 of the light-emitting thyristor L1 is connected to the gate Gf1 of the setting thyristor F1, which is set to −1.4 V, via the resistor Rp. It is assumed here that a potential drop 5 due to the resistor Rp is 0.8 V. Thus, the gate Gs1 of the light-emitting thyristor L1 is set to −2.2 V, which is given by subtracting the potential drop 6 (0.8 V) due to the resistor Rp from the potential (−1.4 V) of the gate Gf1, from −3.3 V. Accordingly, the on-voltage Von of the light-emitting thyristor L1 becomes −3.6 V.

The gate Gs2 of the light-emitting thyristor L2 is connected to the gate Gf2 of the setting thyristor F2, which is set to −2.8 V, via the resistor Rp. Thus, the gate Gs2 of the light-emitting thyristor L2 is set to −2.8 V from −3.3 V. Accordingly, the on-voltage Von of the light-emitting thyristor L2 changes from −4.7 V to −4.2 V. The light-emitting thyristor L3 and the subsequent light-emitting thyristors are not affected by the change of the transfer thyristor T1 to the on state. Thus, the on-voltages Von of the light-emitting thyristor L3 and the subsequent light-emitting thyristors are maintained at −4.7 V.

(4) Time d

At time d, the setting signal φf1 changes from "H" (0 V) to "L" (−3.3 V). Accordingly, the setting signal line 75 to which the setting signal φf1 is supplied changes from "H" (0 V) to "L" (−3.3 V).

The cathodes of the setting thyristors F are connected to the setting signal line 75. Thus, when the setting signal line 75 changes from "H" (0 V) to "L" (−3.3 V), the setting thyristor F1 whose on-voltage Von is −2.8 V turns on and changes from the off state to the on state. That is, at time c, since the on-voltage Von of the setting thyristor F1 becomes −2.2 V, the setting thyristor F1 is ready to change to the on state.

Then, the gate Gf1 of the setting thyristor F1 is set to "H" (0 V) from −1.4 V, and the cathode of the setting thyristor F1 has a potential close to −1.4 V. However, the description is given on the assumption that the setting signal line 75 is maintained at "L" (−3.3 V). Even if the setting signal line 75 has a potential higher than (a negative potential whose absolute value is smaller than) "L" (−3.3 V), it is desirable that the setting signal line 75 not have a potential higher than (a negative potential whose absolute value is smaller than) a potential at which the setting thyristor F whose on-voltage Von is −2.8 V turns on. If the setting signal line 75 has a potential higher than (a negative potential whose absolute value is smaller than) the potential at which the setting thyristor F whose on-voltage Von is −2.8 V turns on, it is desirable to provide resistors such as the power-supply-line resistors R between the setting signal line 75 and the cathodes of the setting thyristors F.

At time d, the setting thyristor F2 whose on-voltage Von is −4.2 V does not turn on, and the setting thyristor F3 and the subsequent setting thyristors whose on-voltages Von are −4.7 V do not turn on.

When the setting thyristor F1 changes to the on state and the gate Gf1 of the setting thyristor F1 changes from −1.4 V to "H" (0 V), the gate Gs1 of the light-emitting thyristor L1, which is connected to the gate Gf1 of the setting thyristor F1 via the resistor Rp, is set to −0.8 V due to the potential drop across the resistor Rp from −2.2 V. Accordingly, the on-voltage Von of the light-emitting thyristor L1 becomes −2.2 V. Then, since the cathode of the light-emitting thyristor L1 is connected to the illumination signal line 74, which is set to "L" (−3.3 V), the light-emitting thyristor L1 turns on and changes from the off state (non-illuminated state) to the on state (illuminated state).

Thus, the gate Gs1 of the light-emitting thyristor L1 is set to "H" (0 V) from −0.8 V. In addition, the cathode of the light-emitting thyristor L1 has a potential close to −1.4 V.

At time d, the light-emitting thyristor L2 whose on-voltage Von is −4.2 V does not turn on, and the light-emitting thyristor L3 and the subsequent light-emitting thyristors whose on-voltages Von are −4.7 V do not turn on.

When the light-emitting thyristor L1 changes from the non-illuminated state to the illuminated state, the cathode of the light-emitting thyristor L1 has a potential close to −1.4 V. However, the description is given on the assumption that the illumination signal line 74 is maintained at "L" (−3.3 V). Even if the illumination signal line 74 has a potential higher than (a negative potential whose absolute value is smaller than) "L" (−3.3 V), it is desirable that the illumination signal line 74 not have a potential higher than (a negative potential whose absolute value is smaller than) a potential at which the light-emitting thyristor L whose on-voltage Von is −2.2 V turns on. If the illumination signal line 74 has a potential higher than (a negative potential whose absolute value is smaller than) the potential at which the light-emitting thyristor L whose on-voltage Von is −2.2 V turns on, it is desirable to provide resistors such as the power-supply-line resistors R between the illumination signal line 74 and the cathodes of the light-emitting thyristors L.

(5) Time e

At time e, the setting signal φf1 changes from "L" (−3.3 V) to "H" (0 V). Accordingly, the setting signal line 75 to which the setting signal φf1 is supplied changes from "L" (−3.3 V) to "H" (0 V).

Then, the anode and cathode of the setting thyristor F1, which is in the on state, are set to "H" (0 V). Thus, the setting thyristor F1 turns off and changes from the on state to the off state. However, the gate Gf1 of the setting thyristor F1 is set to −1.4 V via the connection diode Df1 since the gate Gt1 of the transfer thyristor T1, which is in the on state, remains at "H" (0 V). Accordingly, the on-voltage Von of the setting thyristor F1 is maintained at −2.8 V.

The illumination signal line 74 supplies a signal for continuously applying a maintenance voltage for maintaining the on state of the light-emitting thyristor L1 and providing a maintenance current for keeping the light-emitting thyristor L1 illuminated. Thus, the light-emitting thyristor L1 remains in the on state. The gate Gs1 of the light-emitting thyristor L1 is set to "H" (0 V). A potential difference between the voltage of the gate Gs1 of the light-emitting thyristor L1, i.e., "H" (0 V), and the voltage of the gate Gf1 of the setting thyristor F1, i.e., −1.4 V, is held by the resistor Rp.

(6) Time f

At time f, the transfer signal φ2 changes from "H" (0 V) to "L" (−3.3 V). Accordingly, the transfer signal line 73 to which the transfer signal φ2 is supplied changes from "H" (0 V) to "L" (−3.3 V).

The even-numbered transfer thyristors T2, T4, T6, etc. are connected to the transfer signal line 73. Thus, when the transfer signal line 73 changes from "H" (0 V) to "L" (−3.3 V), the transfer thyristor T2 whose on-voltage Von is −2.8 V turns on and changes from the off state to the on state.

Then, the gate Gt2 of the transfer thyristor T2 is set to "H" (0 V) from −1.4 V, and the cathode of the transfer thyristor T2 has a potential close to −1.4 V. Accordingly, the potential of the transfer signal line 73 changes from "L" (−3.3 V) to a potential equal to that of the cathode of the transfer thyristor T2, i.e., the potential close to −1.4 V.

At time f, the even-numbered transfer thyristors T4, T6, T8, etc. have an on-voltage Von of −4.7 V and thus do not turn on.

That is, at time d in the period U(L1) from time c to time f, the light-emitting thyristor L1 is set to the illuminated state.

When the transfer thyristor T2 changes to the on state and the gate Gt2 is set to "H" (0 V) from −1.4 V, as in the transfer thyristor T2 at time c, the gate Gt3 of the transfer thyristor T3, which is connected to the gate Gt2 of the transfer thyristor T2 via the coupling diode Dt2, is set to −1.4 V from −2.8 V. Accordingly, the on-voltage Von of the transfer thyristor T3 changes from −4.2 V to −2.8 V.

The gate Gt4 of the transfer thyristor T4, which is connected to the gate Gt3 of the transfer thyristor T3 via the coupling diode Dt3, is set to −2.8 V from −3.3 V. Accordingly, the on-voltage Von of the transfer thyristor T4 changes from −4.7 V to −4.2 V. The transfer thyristor T5 and the subsequent transfer thyristors are not affected by the change of the transfer thyristor T2 to the on state. Thus, the on-voltages Von of the transfer thyristor T5 and the subsequent transfer thyristors are maintained at −4.7 V.

At this time, the gate Gf2 of the setting thyristor F2 is connected to the gate Gt2 of the transfer thyristor T2, which is set to "H" (0 V), via the connection diode Df2. Thus, the gate Gf2 of the setting thyristor F2 is set to −1.4 V from −2.8 V. Accordingly, the on-voltage Von of the setting thyristor F2 becomes −2.8 V.

The gate Gf3 of the setting thyristor F3 is connected to the gate Gt3 of the transfer thyristor T3, which is set to −1.4 V, via the connection diode Df3. Thus, the gate Gf3 of the setting thyristor F3 is set to −2.8 V. Accordingly, the on-voltage Von of the setting thyristor F3 becomes −4.2 V. The setting thyristor F4 and the subsequent setting thyristors are not affected by the change of the transfer thyristor T2 to the on state. Thus, the on-voltages Von of the setting thyristor F4 and the subsequent setting thyristors are maintained at −4.7 V.

At time f, since the setting signal line 75 is set to "H" (0 V), none of the setting thyristors F turns on.

The gate Gs2 of the light-emitting thyristor L2 is connected to the gate Gf2 of the setting thyristor F2, which is set to −1.4 V, via the resistor Rp. Thus, the gate Gs2 of the light-emitting thyristor L2 is set to −2.2 V from −3.3 V. Accordingly, the on-voltage Von of the light-emitting thyristor L2 changes from −4.7 V to −3.6 V.

The gate Gs3 of the light-emitting thyristor L3 is connected to the gate Gf3 of the setting thyristor F3, which is set to −2.8 V, via the resistor Rp. Thus, the gate Gs3 of the light-emitting thyristor L3 is set to −2.8 V from −3.3 V. Accordingly, the on-voltage Von of the light-emitting thyristor L3 changes from −4.7 V to −4.2 V. The light-emitting thyristor L4 and the subsequent light-emitting thyristors are not affected by the change of the transfer thyristor T2 to the on state. Thus, the on-voltages Von of the light-emitting thyristor L4 and the subsequent light-emitting thyristors are maintained at −4.7 V.

At this time, since the illumination signal line 74 is maintained at "L" (−3.3 V), the light-emitting thyristor L1 remains in the illuminated state. However, the other light-emitting thyristors L do not turn on.

(7) Time g

At time g, the transfer signal φ1 changes from "L" (−3.3 V) to "H" (0 V). Accordingly, the transfer signal line 72 to which the transfer signal φ1 is supplied changes from "L" (−3.3 V) to "H" (0 V).

The odd-numbered transfer thyristors T1, T3, T5, etc. are connected to the transfer signal line 72. Thus, the anode and cathode of the transfer thyristor T1 whose cathode is connected to the transfer signal line 72 are set to "H" (0 V). The transfer thyristor T1 then turns off and changes from the on state to the off state.

Then, the voltage of the gate Gt1 of the transfer thyristor T1 is changed from "H" (0 V) to "L" (−3.3 V) via the power-supply-line resistor R. The on-voltage Von of the transfer thyristor T1 therefore becomes −4.7 V.

When the transfer thyristor T1 changes to the off state and the gate Gt1 changes from "H" (0 V) to "L" (−3.3 V), the coupling diode Dt1 is reverse biased since the gate Gt2 of the transfer thyristor T2 remains at "H" (0 V). Therefore, the change of the transfer thyristor T1 to the off state does not affect the transfer thyristor T2.

When the transfer thyristor T1 changes to the off state and the gate Gt1 of the transfer thyristor T1 changes from "H" (0 V) to "L" (−3.3 V), the connection diode Df1, which is connected between the gate Gt1 of the transfer thyristor T1 and the gate Gf1 of the setting thyristor F1, is reverse biased. Accordingly, the gate Gf1 of the setting thyristor F1 changes from −1.4 V to "L" (−3.3 V) via the power-supply-line resistor R. The on-voltage Von of the setting thyristor F1 therefore becomes −4.7 V.

At this time, since the illumination signal line 74 is maintained at "L" (−3.3 V), the light-emitting thyristor L1 remains in the illuminated state, and the other light-emitting thyristors L remain in the non-illuminated state. At this time, the gate Gs1 of the light-emitting thyristor L1 is in "H" (0 V). Thus, the gate Gf1 of the setting thyristor F1 is set to a constant voltage, i.e., −3.3×Rp/(Rp+R), via the resistor Rp.

Even if the gate Gf1 of the setting thyristor F1 is set to a voltage higher than (a negative voltage whose absolute value is smaller than) "L" (−3.3 V) due to the gate Gs1 of the light-emitting thyristor L1 in the illuminated state, which is set to "H" (0 V), the connection diode Df1 is reverse biased. Thus, the gate Gt1 of the transfer thyristor T1 is not affected by the potential of the gate Gf1 of the setting thyristor F1. If the voltage of the gate Gt1 of the transfer thyristor T1 is higher than −1.9 V, the on-voltage Von of the transfer thyristor T1 becomes higher than −3.3 V and the transfer thyristor T1 turns on again when the transfer signal φ1 changes from "H" (0 V) to "L" (−3.3 V) at time i, described below. This prevents the on state from being transferred (or propagated) sequentially to the transfer thyristors T. That is, due to the presence of the connection diode Df1, the on state is not prevented from being transferred (or propagated) to the transfer thyristors T.

(8) Time h

At time h, the setting signal φf1 changes from "H" (0 V) to "L" (−3.3 V). Accordingly, the setting signal line 75 to which the setting signal φf1 is supplied changes from "H" (0 V) to "L" (−3.3 V).

Then, as in time d, the setting thyristor F2 whose on-voltage Von is −2.8 V turns on and changes from the off state to the on state. Then, the gate Gf2 of the setting thyristor F2 changes from −1.4 V to "H" (0 V).

Then, the gate Gs2 of the light-emitting thyristor L2, which is connected to the gate Gf2 of the setting thyristor F2 via the resistor Rp, is set to −0.8 V due to the potential drop across the resistor Rp from −2.2 V. Accordingly, the on-voltage Von of the light-emitting thyristor L2 changes from −4.6 V to −2.2 V. Then, since the cathode of the light-emitting thyristor L2 is connected to the illumination signal line 74, which is set to "L" (−3.3 V), the light-emitting thyristor L2 turns on and changes from the off state (non-illuminated state) to the on state (illuminated state).

Accordingly, the light-emitting thyristors L1 and L2 enter the illuminated state and the other light-emitting thyristors L remain in the non-illuminated state. At this time, if the setting thyristor F1 is turned on with the voltage of the gate Gf1 of the setting thyristor F1 being set to a value higher than −1.9 V due to the voltage of the gate Gs1 of the light-emitting thyristor L1, as described above, a voltage is applied so that the setting signal line 75 is set to "L" (−3.3 V) and the setting thyristor F2 can therefore be turned on.

(9) Time i

At time i, the transfer signal φ1 changes from "H" (0 V) to "L" (−3.3 V). Accordingly, the transfer signal line 72 to which the transfer signal φ1 is supplied changes from "H" (0 V) to "L" (−3.3 V).

The odd-numbered transfer thyristors T1, T3, T5, etc. are connected to the transfer signal line 72. As in time c, the transfer thyristor T3 turns on and changes from the off state to the on state. Therefore, the on-voltage Von of the setting thyristor F3 becomes −2.8 V, and the on-voltages Von of the light-emitting thyristors L become −3.6 V.

At this time, since the illumination signal line 74 is maintained at "L" (−3.3 V), the light-emitting thyristors L1 and L2 remain in the illuminated state and the other light-emitting thyristors L remain in the non-illuminated state.

That is, at time h in the period U(L2) from time f to time i, the light-emitting thyristor L2 is set to the illuminated state.

(10) Time j

At time j, the transfer signal φ2 changes from "L" (−3.3 V) to "H" (0 V). Accordingly, the transfer signal line 73 to which the transfer signal φ2 is supplied changes from "L" (−3.3 V) to "H" (0 V).

The even-numbered transfer thyristors T2, T4, T6, etc. are connected to the transfer signal line 73. Thus, the transfer thyristor T2, which is in the on state, turns off and changes from the on state to the off state. Then, as in time g, the on-voltages Von of the transfer thyristor T2 and the setting thyristor F2 become −4.7 V.

At this time, since the illumination signal line 74 remains at "L" (−3.3 V), the light-emitting thyristors L1 and L2 remain in the illuminated state and the other light-emitting thyristors L remain in the non-illuminated state.

(11) Time k

Time k corresponds to the timing at time d when the setting signal φf1 changes from "H" (0 V) to "L" (−3.3 V). At time k, however, the setting signal φf1 is maintained at "H" (0 V). Accordingly, the setting signal line 75 to which the setting signal φf1 is supplied is maintained at "H" (0 V).

For this reason, the setting thyristor F3 does not turn on and remains in the off state although the on-voltage Von of the setting thyristor F3 is −2.2 V.

In addition, the light-emitting thyristor L3 does not turn on and remains in the non-illuminated state even when the on-voltage Von of the light-emitting thyristor L3 is maintained at −3.6 V and the illumination signal line 74 remains at "L" (−3.3 V).

At this time, since the illumination signal line 74 is maintained at "L" (−3.3 V), the light-emitting thyristors L1 and L2 remain in the illuminated state and the other light-emitting thyristors L remain in the non-illuminated state.

(12) Time l

At time l, the transfer signal φ2 changes from "H" (0 V) to "L" (−3.3 V). Accordingly, the transfer signal line 73 to which the transfer signal φ2 is supplied changes from "H" (0 V) to "L" (−3.3 V).

The even-numbered transfer thyristors T2, T4, T6, etc. are connected to the transfer signal line 73. As in time f, the transfer thyristor T4 whose on-voltage Von is −2.8 V turns on and changes from the off state to the on state. Accordingly, the on-voltage Von of the setting thyristor F4 becomes −2.8 V. In addition, the on-voltage Von of the light-emitting thyristor L4 becomes −3.6 V.

That is, at time k in the period U(L3) from time i to time l, the light-emitting thyristor L3 is set to the non-illuminated state.

(13) From Time l to Time s

At time m in the period U(L4) from time l to time n, the light-emitting thyristor L4 is set to the illuminated state.

At time o in the period U(L5) from time n to time p, the light-emitting thyristor L5 is set to the illuminated state.

At time q in the period U(L6) from time p to time r, the light-emitting thyristor L6 is set to the illuminated state.

Accordingly, at time s at which the illumination setting period Uf ends, all of the light-emitting thyristors L have been set to the illuminated state/non-illuminated state.

At time s, the transfer thyristor T corresponding to (or assigned the same number as that assigned to) the light-emitting thyristor L that was last set to the illuminated state/non-illuminated state is maintained in the on state. For example, when the last set light-emitting thyristor L is an odd-numbered light-emitting thyristor, the transfer signal φ1 is maintained at "L" (−3.3 V) and the transfer signal φ2 is maintained at "H" (0 V). When the last set light-emitting thyristor L is an even-numbered light-emitting thyristor, the transfer signal φ1 and the transfer signal φ2 are maintained at the states opposite to those described above. In addition, the setting signal φf1 is maintained at "H" (0 V).

At this time, since the illumination signal line 74 is maintained at "L" (−3.3 V), the light-emitting thyristors L set to the illuminated state remain in the illuminated state and the light-emitting thyristors L set to the non-illuminated state remain in the non-illuminated state during the illumination setting period Uf. That is, multiple light-emitting thyristors L are in the illuminated state in parallel. It is desirable to inhibit at least either the operation for the transfer signals φ1 and φ2 or the operation for the setting signals φf during the period from time s to time t. That is, the corresponding signals are kept disabled. This may prevent an unintended light-emitting thyristor L from erroneously emitting light during the period from time s to time t.

(14) Time t

At time t, the illumination signal φI changes from "L" (−3.3 V) to "H" (0 V). Accordingly, the illumination signal line 74 to which the illumination signal φI is supplied changes from "L" (−3.3 V) to "H" (0 V).

Since the cathodes of the light-emitting thyristors L are connected to the illumination signal line 74, both the anodes and cathodes of the light-emitting thyristors L are set to "H" (0 V). Accordingly, the light-emitting thyristors L that are in the illuminated state turn off and change from the on state (illuminated state) to the off state (non-illuminated state). That is, multiple light-emitting thyristors L that are in the on state collectively enter the off state simultaneously.

(15) Time u

At time u, the transfer signal φ1 or the transfer signal φ2, which is in "L" (−3.3 V), is changed to "H" (0 V). In FIG. 5, the transfer signal φ2 is in "L" (−3.3 V). Accordingly, the transfer thyristor T assigned the same number as that assigned to the last set light-emitting thyristor L turns off.

Thus, the state returns to the initial state (at time a).

In the foregoing description, all of the light-emitting thyristors L disposed on the light-emitting chip C1 are set to either the illuminated state or the non-illuminated state during the illumination setting period Uf, and then remain in the illuminated state/non-illuminated state during the continuous illumination period Uc. Alternatively, the light-emitting thyristors L disposed on the light-emitting chip C1 may be separated into multiple light-emitting thyristor groups and the light-emitting thyristors L in each of the light-emitting thyristor groups may be set to either the illuminated state or the non-illuminated state.

In this case, the illumination setting period Uf and the continuous illumination period Uc may be set for one of the light-emitting thyristor groups, and, after the continuous illumination period Uc has elapsed, the illumination setting period Uf and the continuous illumination period Uc may be set for the subsequent light-emitting thyristor group. Thus, the operation to be performed at time u illustrated in FIG. 5 is not executed but the operation from time c is performed. It is desirable that the transfer signal φ2 have a waveform indicated by a broken line in the period from time c to time d.

A waveform of the transfer signal φ2 indicated by a solid line during the period from time a to time d is used for the initial state.

In the first exemplary embodiment, as described above, the transfer signals φ1 and φ2 are alternately set to "L" (−3.3 V) in the illumination setting period Uf, which enables the on state to be propagated to the transfer thyristors T1, T2, T3, etc. in this order. It should be noted that the period of one cycle of the transfer signals φ1 and φ2 ranges from time c to time i of the transfer signal φ1 illustrated in FIG. 5. The transfer signal φ1 and the transfer signal φ2 are shifted by half a cycle relative to each other. Part of the period during which the transfer signal φ1 remains at "L" (−3.3 V) and part of the period during which the transfer signal φ2 remains at "L" (−3.3 V) are made to overlap in time, which enables the propagation of the on state of the transfer thyristor T.

Further, the setting signal φf1 is set to "L" (−3.3 V) when any one of the transfer thyristors T is in the on state, which enables the setting thyristor F connected to (or assigned the same number as that assigned to) the transfer thyristor T that is in the on state to enter the on state. On the other hand, the setting signal φf1 is maintained at "H" (0 V), which enables the setting thyristor F connected to (or assigned the same number as that assigned to) the transfer thyristor T that is in the on state to remain in the off state. Then, the setting thyristor F is changed to the on state, which enables the light-emitting thyristor L connected to (or assigned the same number as that assigned to) the setting thyristor F to be set to the illuminated state (on state). On the other hand, the setting thyristor F is maintained in the off state, which enables the light-emitting thyristor L connected to (or assigned the same number as that assigned to) the setting thyristor F to be set to the non-illuminated state (off state).

Multiple light-emitting thyristors L that are set to the illuminated state in the illumination setting period Uf are maintained in the illuminated state in parallel during the next, continuous illumination period Uc. This may increase the amount of light obtained from the light-emitting thyristors L without increasing the light emission intensity (the amount of light (luminous flux) per unit time) of the light-emitting thyristors L.

In FIG. 5, when the setting signal #1 is in "L" (−3.3 V) over consecutive periods U such as the period U(L1) and the period U(L2), the setting signal φf1 may be maintained at "L" (−3.3 V) without being returned to "H" (0 V) between time e and time h. That is, non-return-to-zero (NRZ) may be used. The same applies to the periods U(L4) to U(L6). In FIG. 5, portions for the setting signal φf1 where NRZ may be used are indicated by broken lines.

In the illumination setting period Uf, the light-emitting thyristors L are sequentially set to either the illuminated state or the non-illuminated state. Thus, the actual illumination period (illumination time) differs between a light-emitting thyristor L set to the illuminated state in the first half (e.g., at the beginning) of the illumination setting period Uf and a light-emitting thyristor L set to the illuminated state in the second half (e.g., at the end) of the illumination setting period Uf. For example, in FIG. 5, the light-emitting thyristor L1 remains in the illuminated state over the illumination period from time d to time t. In contrast, the light-emitting thyristor L6 remains in the illuminated state over the illumination period from time q to time t. That is, the illumination period of the light-emitting thyristor L6 is shorter than that of the light-emitting thyristor L1 by an amount corresponding to the period from time d to time q.

The period U (the period U1, U2, U3, or the like) in which each of the light-emitting thyristors L is set to either the illuminated state or the non-illuminated state is 10 ns, for example. In this case, the total illumination setting period Uf of the 128 light-emitting thyristor L is 1.28 µs.

In this case, if the continuous illumination period Uc is 100 µs, the illumination setting period Uf accounts for only approximately 1.3% of the continuous illumination period Uc. That is, differences between illumination periods within the illumination setting period Uf can be regarded as errors. Accordingly, the illumination setting period Uf and the continuous illumination period Uc may be set so that differences between illumination periods within the illumination setting period Uf can be regarded as errors.

As described above, making the continuous illumination period Uc longer than the illumination setting period Uf may reduce the difference in the amount of light emission between multiple light-emitting thyristors L that is dependent on the order of light emission, compared when the continuous illumination period Uc is shorter than the illumination setting period Uf. As an example, the illumination setting period Uf may be less than or equal to 20% of the continuous illumination period Uc, or may be less than or equal to 10%, in which case the difference in the amount of light emission may further be reduced.

The illumination method in which the transfer thyristors T are sequentially set to the on state and, when each of the setting thyristors F is set to the on state in accordance with the setting signal $\phi$f1, the corresponding one of the light-emitting thyristors L is set to the on state such that the multiple light-emitting thyristors L remain in the illuminated state in parallel in the way described above is referred to herein as a full illumination method. There is conceivable another method (different method) in which the transfer thyristors T are sequentially set to the on state, each of the setting thyristors F is maintained in the on state in accordance with the setting signal $\phi$f1, and, after the completion of the series of transfer control operations for sequentially setting the transfer thyristors T to the on state, the multiple light-emitting thyristors L corresponding to the multiple setting thyristors F that are in the on state are collectively set to the illuminated state and thereafter remain in the illuminated state in parallel. However, this different method requires a resistor between each of the setting thyristors F and the setting signal line 75 that has a resistance value for maintaining the cathode potential of the setting thyristor F at an appropriate value or requires three or more voltage values including an intermediate potential as the setting signal $\phi$f1. In contrast, the full illumination method according to this exemplary embodiment does not require a resistor having a resistance value for maintaining the cathode potential of each of the setting thyristors F at an appropriate value, and, in addition, two voltage values can be used as the setting signal $\phi$f1 to perform control. That is, the full illumination method may use simpler logic than the different method and may prevent erroneous turning off of the illumination of the setting thyristors F or prevent an increase in power consumption, which would be caused by the use of an intermediate voltage value.

In the circuit configuration illustrated in FIG. 4, the light-emitting chip C may be formed without using the setting thyristors F but may be formed by connecting the gates Gs of the light-emitting thyristors L and the gates Gt of the transfer thyristors T. In this case, the light-emitting chip C does not have the $\phi$f terminal.

In this case, in the light-emitting device 65 illustrated in FIG. 3, the illumination signal generation unit 140 is removed and the setting signal generation unit 150 is replaced with an illumination signal generation unit. That is, the illumination signal generation unit used in place of the setting signal generation unit 150 generates respective illumination signals $\phi$I for the light-emitting chips C (for example, illumination signals $\phi$I1, $\phi$I2, $\phi$I3, etc.) and supplies the illumination signals $\phi$I to the respective $\phi$I terminals on the light-emitting chips C.

In this case, the illumination signal $\phi$I1 for the light-emitting chip C1 may have the same waveform as that of the setting signal $\phi$f1 illustrated in FIG. 5. That is, in FIG. 5, the setting signal $\phi$f1 may be read as the illumination signal $\phi$I1. In FIG. 5, at time d when the transfer thyristor T1 is in the on state, the illumination signal $\phi$I1 is changed from "H" (0 V) to "L" (−3.3 V). Accordingly, the light-emitting thyristor L1, which is connected to the transfer thyristor T1, turns on and changes from the off state (non-illuminated state) to the on state (illuminated state). Then, at time e, the illumination signal $\phi$I1 is changed from "L" (−3.3 V) to "H" (0 V). Then, the light-emitting thyristor L1 turns off and changes from the on state (illuminated state) to the off state (non-illuminated state). In this case, the illumination period of the light-emitting thyristor L1 starts at time d and ends at time e.

Accordingly, alternately setting the transfer signals $\phi$1 and $\phi$2 to "L" (−3.3 V) allows the on state to be propagated to the transfer thyristors T1, T2, T3, etc. in this order. Further, the illumination signal $\phi$I is set to "L" (−3.3 V) when any one of the transfer thyristors T is in the on state, which enables the light-emitting thyristor L connected to (or assigned the same number as that assigned to) the transfer thyristor T that is in the on state to be set to the illuminated state (on state). The illumination signal $\phi$I is maintained at "H" (0 V), which enables the light-emitting thyristor L connected to (or assigned the same number as that assigned to) the setting thyristor F to be set to the non-illuminated state (off state). When the setting thyristor F is maintained in the off state, the light-emitting thyristor L connected to (or assigned the same number as that assigned to) the setting thyristor F is set to the non-illuminated state (off state).

Here, the transfer thyristors T1, T2, T3, etc. are sequentially set to the on state, and the light-emitting thyristors L sequentially enter the illuminated state. That is, the light-emitting thyristors L on the light-emitting chip C are not illuminated in parallel but are illuminated sequentially.

The illumination method in which the light-emitting thyristors L are sequentially brought into the illuminated state in the way described above is referred to herein as a sequential illumination method.

In the sequential illumination method, in order to obtain a predetermined amount of light from a light-emitting thyristor L, the light emission intensity of the light-emitting thyristor L is increased or the illumination period of the light-emitting thyristor L (corresponding to the period from time d to time e illustrated in FIG. 5) is increased.

To obtain the same amount of light from light-emitting thyristors L set to the illuminated state in the full illumination method and the sequential illumination method with the light-emitting thyristors L having the same light emission intensity, the illumination periods of the light-emitting thyristors L are 100 µs in the full illumination method and the sequential illumination method.

In the sequential illumination method, the time taken for all light-emitting thyristors L on the light-emitting chip C having 128 light-emitting thyristors L to complete illumination is 12.8 ms. In contrast, the full illumination method only requires 100 µs.

In the sequential illumination method, to reduce the time taken for all the light-emitting thyristors L to complete illumination, the light emission intensity of the light-emitting thyristors L is increased (enhanced). However, it is not easy to increase (enhance) the light emission intensity of the light-emitting thyristors L since the light emission intensity of the light-emitting thyristors L depends on the structure or characteristics of the light-emitting thyristors L.

As described above, the light-emitting chip C is driven using the full illumination method, which may enable the desired amount of light to be achieved even when each of the light-emitting thyristors L has low light emission intensity. That is, the amount of light from a light-emitting thyristor may be increased without increasing the light emission intensity of the light-emitting thyristor.

In an image forming operation, the image forming speed may be increased.

In order to achieve the full illumination method in which multiple light-emitting thyristors L are maintained in the illuminated state in parallel, as illustrated in FIG. 4, the light-emitting chip C according to the first exemplary embodiment includes the setting thyristors F and the connection diodes Df between the transfer thyristors T and the light-emitting thyristors L. The setting thyristors F and the connection diodes Df serve to set the light-emitting thyristors L to either the illuminated state or the non-illuminated state and to prevent the transfer thyristors T from being affected by the light-emitting thyristors L that are maintained in the illuminated state.

The circuit configuration between the transfer thyristors T and the light-emitting thyristors L is not limited to that illustrated in FIG. 4. For example, instead of the resistors Rp illustrated in FIG. 4, diodes similar to the connection diodes Df may be disposed between the gates Gf of the setting thyristors F and the gates Gs of the light-emitting thyristors L. In this case, the gate Gs1 of the light-emitting thyristor L may be connected to the power supply line 71 by using a resistor similar to the power-supply-line resistor R. With this configuration, the light-emitting thyristors L are set to the illuminated state or the non-illuminated state in accordance with the on state or the off state of the setting thyristors F. In addition, the transfer thyristors T are not affected by the light-emitting thyristors L that are maintained in the illuminated state.

Second Exemplary Embodiment

In the first exemplary embodiment, a light-emitting thyristor L that is set to the illuminated state (on state) remains in the illuminated state during the continuous illumination period Uc. Thus, there is no difference in illumination period for a light-emitting thyristor L that is in the illuminated state. It should be noted that differences between illumination periods within the illumination setting period Uf are regarded as errors and are ignored. That is, the amount of light of the light-emitting thyristors L is represented as "1/0" and represents no gradation level.

In a second exemplary embodiment, each of the light-emitting thyristors L is controlled so that the amount of light therefrom represents a predetermined gradation level.

An image forming apparatus 1 and other devices according to the second exemplary embodiment are similar to those in the first exemplary embodiment. In the following, different portions are described, whereas similar portions are not repeatedly described.

Figure 6:
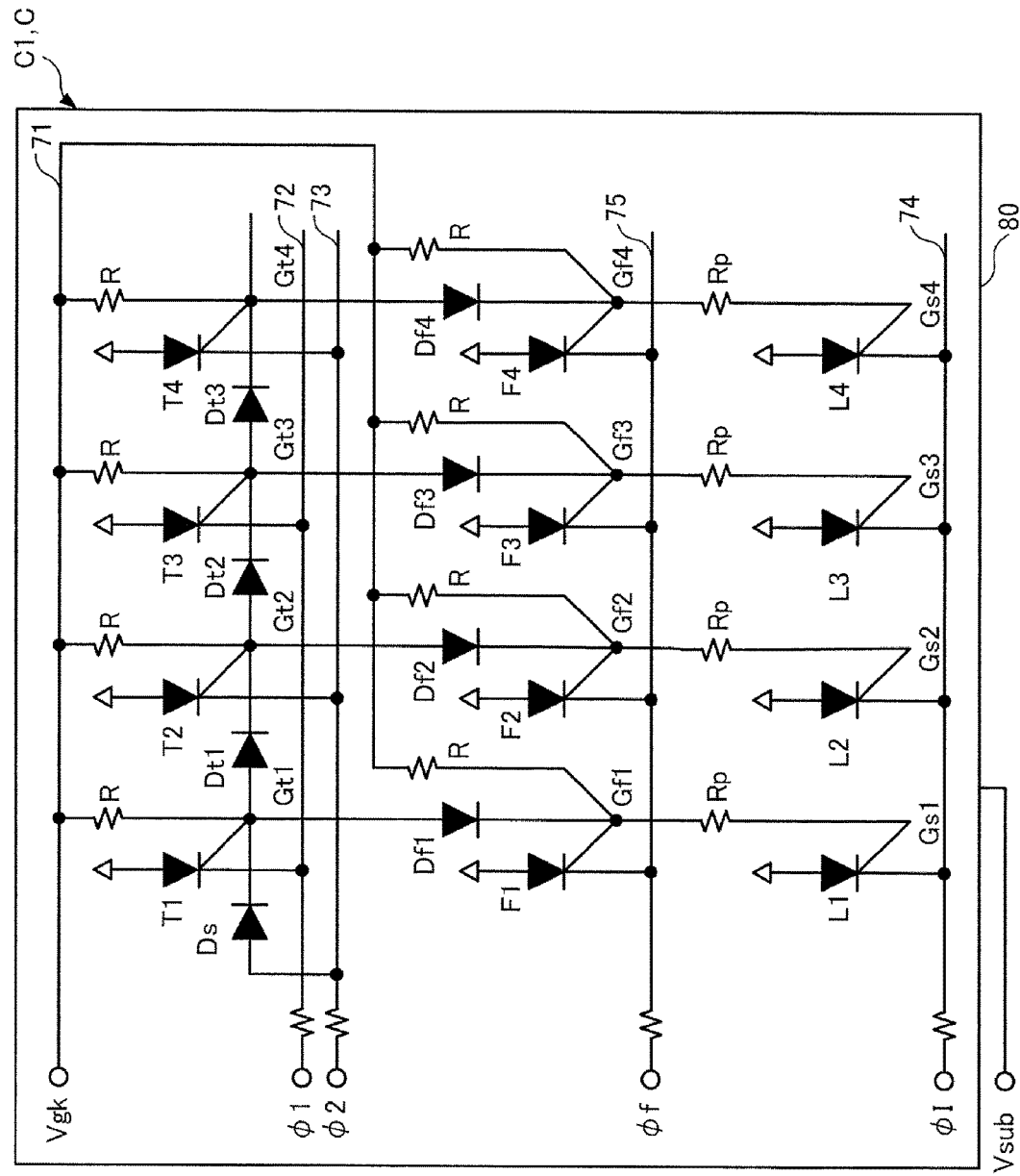
FIG. 6 is an equivalent circuit diagram illustrating a circuit configuration of a light-emitting chip having an SLED array according to a second exemplary embodiment.

FIG. 6 is an equivalent circuit diagram illustrating a circuit configuration of a light-emitting chip C having an SLED array according to the second exemplary embodiment. For convenience of description, the number of light-emitting thyristors L on each of the light-emitting chips C illustrated in FIG. 6 is four, by way of example. The number of light-emitting thyristors L on each of the light-emitting chips C may be any value other than four.

Unlike the light-emitting chip C1(C) according to the first exemplary embodiment illustrated in FIG. 4, the light-emitting chip C1(C) illustrated in FIG. 6 includes four transfer thyristors T, four light-emitting thyristors L, and four setting thyristors F. Thus, the same or substantially the same portions are given the same numerals and are not described repeatedly.

Figure 7:
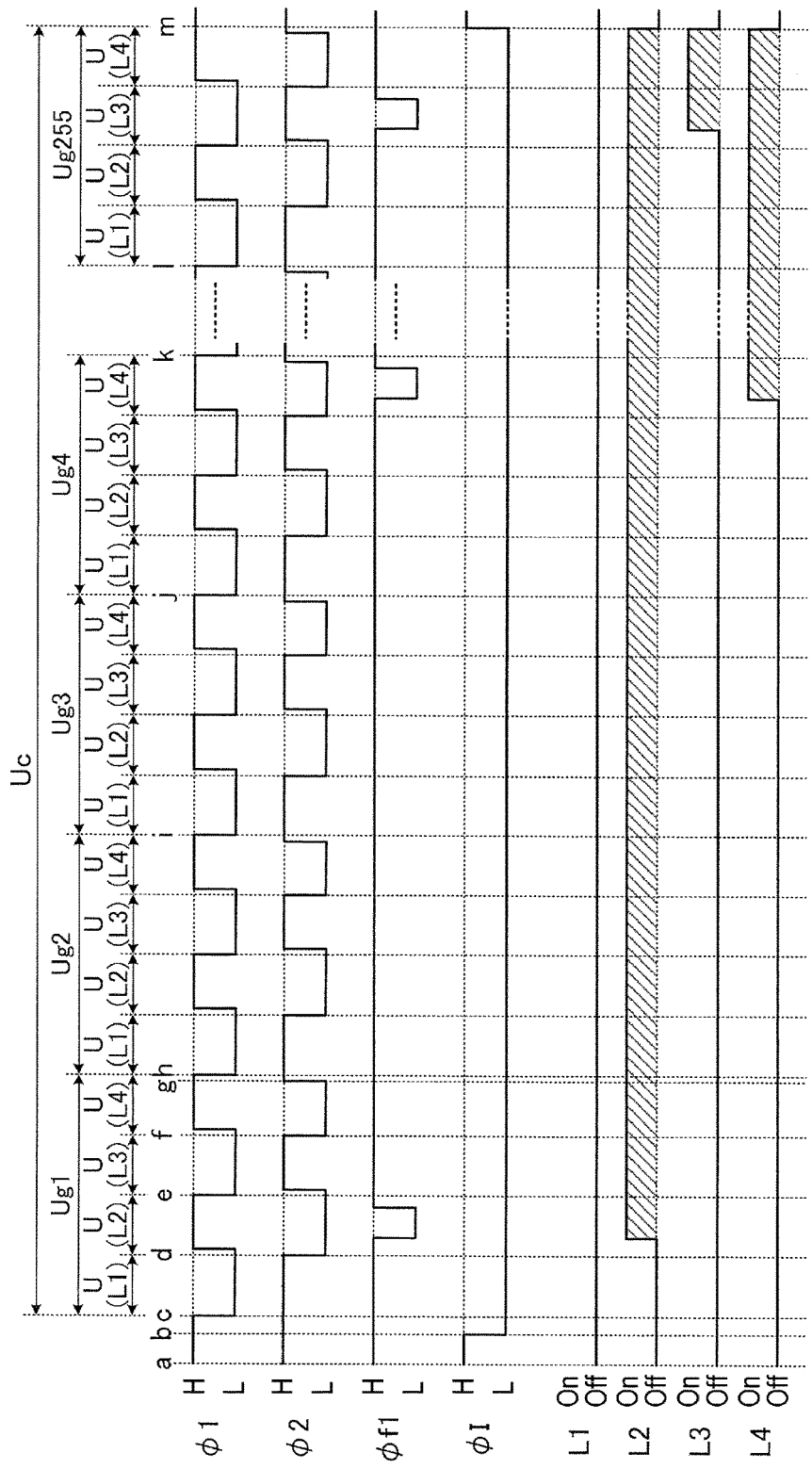
FIG. 7 is a timing chart illustrating the operation of the light-emitting chip according to the second exemplary embodiment.

FIG. 7 is a timing chart illustrating the operation of a light-emitting chip C according to the second exemplary embodiment.

In the timing chart illustrated in FIG. 7, time passes in alphabetical order (in the order of times a, b, c, etc.). In FIG. 7, times a, b, c, etc. are different from times a, b, c, etc. illustrated in FIG. 5.

It is assumed here that the light-emitting chip C1(C) illustrated in FIG. 6 achieves 256 gradation levels. That is, to realize 256 gradation levels, the continuous illumination period Uc over which the illuminated state is continuously maintained is divided into 255 periods to obtain gradation setting periods Ug1, Ug2, Ug3, . . . , and Ug255 in which gradation levels are set. The gradation setting periods Ug1, Ug2, Ug3, . . . , and Ug255 are referred to collectively as the gradation setting periods Ug or individually as a gradation setting period Ug unless they are individually identified. Each of the gradation setting periods Ug includes periods U(L1) to U(L4) in which the light-emitting thyristors L1 to L4 are respectively set to either the illuminated state or the non-illuminated state. The periods U(L1) to U(L4) are referred to collectively as the periods U or individually as a period U unless they are individually identified.

The gradation setting period Ug1 starts at time c and ends at time h, the gradation setting period Ug2 starts at time h and ends at time i, the gradation setting period Ug3 starts at time i and ends at time j, the gradation setting period Ug4 starts at time j and ends at time k, and the gradation setting period Ug255 starts at time l and ends at time m. The gradation setting periods Ug5 to Ug254 are included between the gradation setting period Ug4 and the gradation setting period Ug255. The continuous illumination period Uc starts at time c and ends at time m.

In the gradation setting period Ug1, the period U(L1) in which the light-emitting thyristor L1 is set to either the illuminated state or the non-illuminated state starts at time c and ends at time d, the period U(L2) in which the light-emitting thyristor L2 is set to either the illuminated state or the non-illuminated state starts at time d and ends at time e, the period U(L3) in which the light-emitting thyristor L3 is set to either the illuminated state or the non-illuminated state starts at time e and ends at time f, and the period U(L4) in which the light-emitting thyristor L4 is set to either the illuminated state or the non-illuminated state starts at time f and ends at time h. Each of the gradation setting periods Ug2 to Ug255 also includes periods U in which the light-emitting thyristors L1 to L4 are set to either the illuminated state or the non-illuminated state in a similar way.

As an example, the light-emitting thyristor L1 is maintained in the non-illuminated state (gradation level 0). The light-emitting thyristor L2 is in the illuminated state over 255 periods out of the 255 gradation setting periods Ug (gradation level 255). The light-emitting thyristor L3 is in the illuminated state over one period out of the 255 gradation setting periods Ug (gradation level 1). The light-emitting thyristor L4 is in the illuminated state over 252 periods out of the 255 gradation setting periods Ug (gradation level 252).

That is, each of the light-emitting thyristors L1 to L4 is set to either the illuminated state or the non-illuminated state within any of the 255 gradation setting periods Ug, thereby achieving 256 gradation levels. Such transfer control that the transfer thyristors T1 to T4 are sequentially set to the on state is repeatedly performed a number of times corresponding to the number of gradation levels of the apparatus (e.g., 256 gradation levels) and an intended light-emitting thyristor L starts light emission at the time when this transfer control is repeatedly performed a number of times corresponding to the gradation level to be output, thereby achieving gradation control.

When the period U in which each of the light-emitting thyristors L is set to either the illuminated state or the non-illuminated state is 10 ns, each of the gradation setting periods Ug is 40 ns. Then, the continuous illumination period Uc to achieve 256 gradation levels is 10.2 µs, which is 255 times the gradation setting period Ug, namely, 40 ns.

A description will be given with reference to a timing chart illustrated in FIG. 7.

The operation during the period from time a to time c is the same or substantially the same as that during the period from time a to time c according to the first exemplary embodiment illustrated in FIG. 5.

In the gradation setting period Ug1, the period U(L1) (the period from time c to time d) corresponds to the period U(L1) (the period from time c to time f) illustrated in FIG. 5. However, during the period U(L1) in the gradation setting period Ug1, the setting signal φf1 is maintained at "H" (0 V) and thus the light-emitting thyristor L1 is maintained in the non-illuminated state.

In the gradation setting period Ug1, the period U(L2) (the period from time d to time e) corresponds to the period U(L2) (the period from time f to time i) illustrated in FIG. 5. During the period U(L2) in the gradation setting period Ug1, the setting signal φf1 is set to "L" (−3.3 V) and thus the light-emitting thyristor L1 turns on and changes from the off state (non-illuminated state) to the on state (illuminated state). This state is maintained over the continuous illumination period Uc.

In the gradation setting period Ug1, the period U(L3) (the period from time e to time f) corresponds to the period U(L3) (the period from time i to time l) illustrated in FIG. 5. However, during the period U(L3) in the gradation setting period Ug1, the setting signal φf1 is maintained at "H" (0 V) and thus the light-emitting thyristor L3 is maintained in the non-illuminated state.

In the gradation setting period Ug1, the period U(L4) (the period from time f to time h) corresponds to the period U(L4) (the period from time l to time n) illustrated in FIG. 5. However, during the period U(L4) in the gradation setting period Ug1, the setting signal φf1 is maintained at "H" (0 V) and thus the light-emitting thyristor L4 is maintained in the non-illuminated state.

It should be noted that the transfer signal φ2 changes from "L" (−3.3 V) to "H" (0 V) at time g during the period U(L4) in the gradation setting period Ug1. Then, the transfer thyristor T4 changes from the on state to the off state. Accordingly, all of the transfer thyristors T1 to T4 (see FIG. 6) enter the off state at time h. This state is the same or substantially the same as the state immediately before time c (for the transfer thyristors T, the initial state (at time a)). Thus, the operation of the transfer thyristor T to transfer the on state returns from the transfer thyristor T4 to the transfer thyristor T1.

In the subsequent gradation setting periods Ug2 to Ug255, the operation performed during the gradation setting period Ug1 is repeatedly performed.

The light-emitting thyristor L4 changes from the off state (non-illuminated state) to the on state (illuminated state) during the gradation setting period Ug4, and the light-emitting thyristor L3 changes from the off state (non-illuminated state) to the on state (illuminated state) during the gradation setting period Ug255.

At time m at the end of the gradation setting period Ug255, the illumination signal φI changes from "L" (−3.3 V) to "H" (0 V), which allows the light-emitting thyristors L2, L3, and L4, which are in the on state (illuminated state), to turn off and change from the on state (illuminated state) to the off state (non-illuminated state).

As described above, the light-emitting thyristor L2 remains in the illuminated state during the gradation setting periods Ug1 to Ug255 and thus achieves gradation level 255. The light-emitting thyristor L3 remains in the illuminated state during the gradation setting periods Ug4 to Ug255 and thus achieves gradation level 252. The light-emitting thyristor L4 remains in the illuminated state during the gradation setting period Ug255 and thus achieves gradation level 1. In contrast, the light-emitting thyristor L1 remains in the non-illuminated state during the gradation setting periods Ug1 to Ug255, and thus achieves gradation level 0. That is, 256 gradation levels are realized.

In each of the gradation setting periods Ug, the light-emitting thyristors L1 to L4 are sequentially set to either the illuminated state or the non-illuminated state. Thus, the actual illumination period (illumination time) differs between the light-emitting thyristor L1, which is set to the illuminated state in the period U(L1) at the beginning of the gradation setting period Ug, and the light-emitting thyristor L4, which is set to the illuminated state in the period U(L4) at the end of the gradation setting period Ug. That is, if the light-emitting thyristor L1 and the light-emitting thyristor L4 are set to the same gradation level, the illumination period of the light-emitting thyristor L1 is longer than that of the light-emitting thyristor L4.

When the period U is 10 ns, the difference in illumination period is up to 30 ns.

However, as described above, when the period U is 10 ns, the continuous illumination period Uc to achieve 256 gradation levels is 10.2 µs. Thus, 30 ns, described above, accounts for only approximately 0.29% of the continuous illumination period Uc. That is, differences between illumination periods within the gradation setting period Ug can be regarded as errors. Alternatively, the number of light-emitting thyristors L, the gradation setting period Ug, and the continuous illumination period Uc may be set so that differences between illumination periods within the gradation setting period Ug can be regarded as errors.

Accordingly, a gradation level is set in accordance with the illumination period (the gradation setting period Ug over which the illuminated state is maintained), which makes it easier to perform gradation control than when, for example, a gradation level is set in accordance with the intensity of light.

Third Exemplary Embodiment

In a third exemplary embodiment, each of the light-emitting thyristors L has a laser structure. Each of the light-emitting thyristors L contains a resonator (cavity) in which carriers are confined to produce population inversion. As a result, laser oscillation occurs.

The light-emitting thyristors L having a laser structure emits light in a narrow spectrum and has high light emission intensity. On the contrary, due to the coherence properties, so-called speckle noise is likely to occur.

For example, when the image forming apparatus 1 is a projector that projects and forms an image, speckle may cause spot-like flickering to occur in an image, which leads to deterioration in quality.

In the third exemplary embodiment, accordingly, the illumination signal ϕI is modulated to cause fluctuations of carrier density in the laser structure, thereby causing fluctuations of index of refraction or temperature. This increases the width of the spectrum to reduce the coherence properties, which results in reduction in speckle noise.

The configuration and so on of an image forming apparatus 1 and a light-emitting chip C according to the third exemplary embodiment are similar to those in the first or second exemplary embodiment. In the following, different portions are described, whereas similar portions are not repeatedly described.

Figure 8:
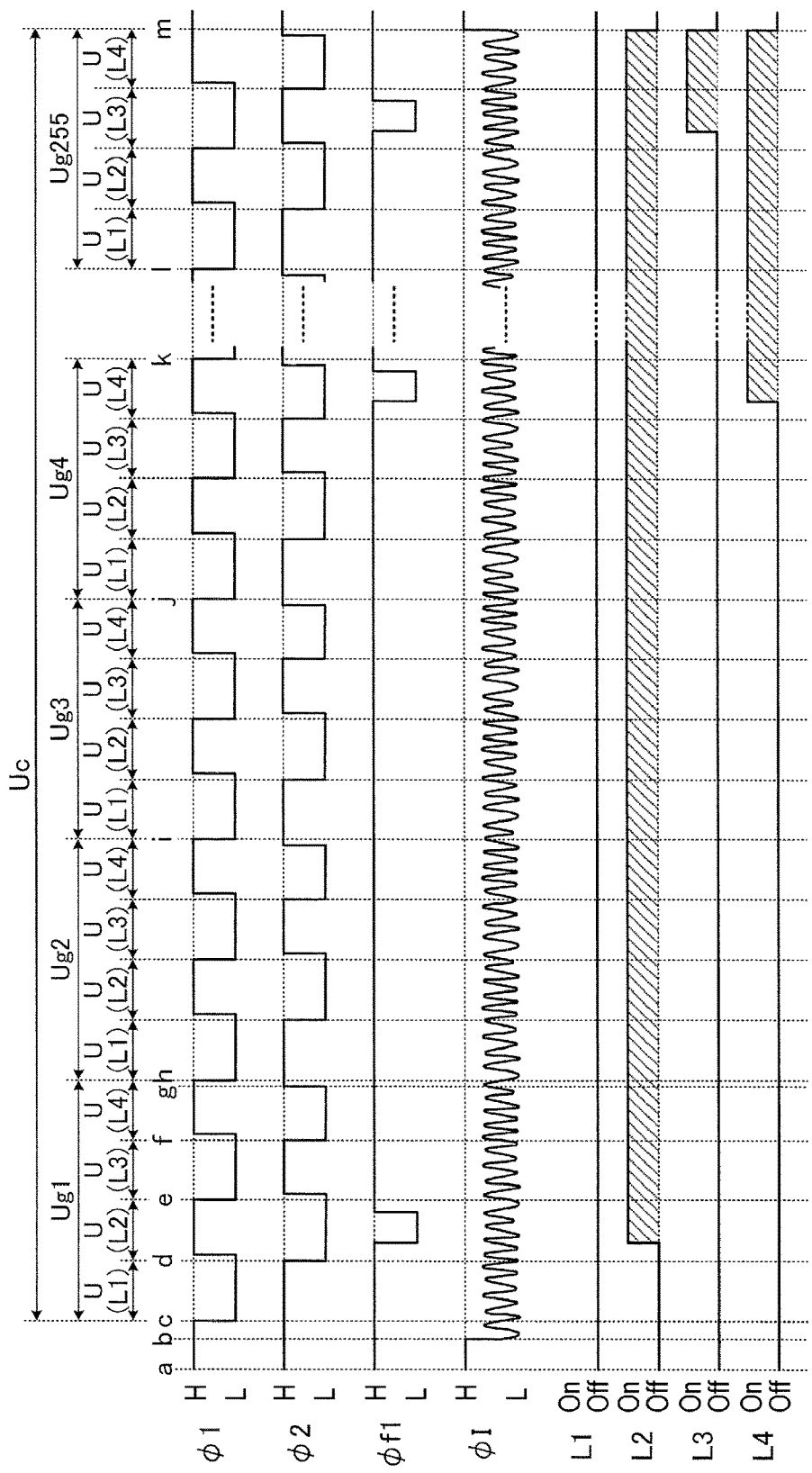
FIG. 8 is a timing chart illustrating the operation of a light-emitting chip according to a third exemplary embodiment.

FIG. 8 is a timing chart illustrating the operation of a light-emitting chip C according to the third exemplary embodiment. The timing chart illustrated in FIG. 8 is different from the timing chart of the operation according to the second exemplary embodiment illustrated in FIG. 7 in the illumination signal ϕI.

In the timing chart of the operation according to the second exemplary embodiment illustrated in FIG. 7, the illumination signal ϕI has two periods, namely, the "H" period and the "L" period. In the "L" period, the illumination signal ϕI is held at a constant potential (for example, −3.3 V). It should be noted that "H" is, 0 V.

In the timing chart of the operation according to the third exemplary embodiment illustrated in FIG. 8, in contrast, the illumination signal ϕI undergoes modulation during the "L" period among the two, "H" and "L" periods for the illumination signal ϕI illustrated in FIG. 7.

As a result of the modulation of the potential (voltage value) of the illumination signal ϕI, the value of current flowing through the light-emitting thyristor L fluctuates. Accordingly, the carrier density fluctuates and the index of refraction fluctuates. Consequently, the oscillation wavelength fluctuates. The fluctuation of the oscillation wavelength disturbs the coherence properties. Thus, speckle noise is reduced.

In the "L" period, the illumination signal ϕI is modulated at a frequency of 300 MHz, for example. It is desirable that modulation be performed in a cycle shorter than the illumination period of the light-emitting thyristors L. For example, when the image forming apparatus 1 is a projector that projects and forms an image, it is desirable that modulation be performed at a frequency that makes such modulation imperceptible to the human eye. The waveform of the modulation may have no periodicity or may exhibit randomness.

As illustrated in FIG. 7, the light-emitting thyristor L that is in the illuminated state remains in the illuminated state during the "L" period of the illumination signal ϕI. Thus, the modulated illumination signal ϕI requires supply of a voltage less than or equal to (a negative voltage whose absolute value is greater than or equal to) a voltage (maintenance voltage) for maintaining the illuminated state (on state) of the light-emitting thyristor L that is in the illuminated state or requires supply of current greater than or equal to a current (maintenance current) for maintaining the illuminated state (on state).

As described above, when a setting thyristor F turns on and changes from the off state to the on state, a light-emitting thyristor L connected to and assigned the same number as that assigned to the setting thyristor F turns on and changes from the off state (non-illuminated state) to the on state (illuminated state). Thus, when the setting thyristor F turns on and changes from the off state to the on state, the illumination signal ϕI is required to be set to a voltage for allowing the light-emitting thyristor L to turn on and change from the off state (non-illuminated state) to the on state (illuminated state), that is, a potential lower than (a negative voltage whose absolute value is larger than) the on-voltage Von of the light-emitting thyristor L1.

That is, the modulation of the illumination signal ϕI is controlled so that when the illuminated state (on state) of the light-emitting thyristor L is maintained, a voltage whose absolute value is greater than or equal to the maintenance voltage or a current whose absolute value is greater than or equal to the maintenance current is supplied and so that when the light-emitting thyristor L is changed from the non-illuminated state (off state) to the illuminated state (on state), a voltage whose absolute value is greater than or equal to the on-voltage Von of the light-emitting thyristor L to be changed to the illuminated state is supplied.

The details of the timing chart are similar to those in the second exemplary embodiment and are not described herein.

The light-emitting thyristor L according to the first exemplary embodiment may have a laser structure and the illumination signal ϕI may be modulated. In addition, a light-emitting thyristor L according to a fourth exemplary embodiment and a fifth exemplary embodiment described below may have a laser structure and the illumination signal ϕI may be modulated.

For example, when the image forming apparatus 1 is a projector that projects and forms an image, reduced speckle contributes to improvement in image quality.

Fourth Exemplary Embodiment

In the first exemplary embodiment, as given by way of example, when each light-emitting chip C includes 128 light-emitting thyristors L, if the period U in which each of the light-emitting thyristors L is set to either the illuminated state or the non-illuminated state is 10 ns, the illumination setting period Uf is 1.28 μs.

If the period U is reduced, the illumination setting period Uf is reduced. However, the period U is determined in accordance with the operation speed of the transfer thyristor T, the setting thyristor F, the light-emitting thyristor L, and so on (rate determination).

In a fourth exemplary embodiment, accordingly, each transfer thyristor T is connected to multiple (two or more) setting thyristors F and multiple light-emitting thyristors L, and multiple light-emitting thyristors L are set to either the illuminated state or the non-illuminated state in parallel within one period U. This configuration effectively reduces the period U. That is, an effective period U in which one light-emitting thyristor L is set to either the illuminated state or the non-illuminated state is reduced to a fractions of the number of setting thyristors F and light-emitting thyristors L connected to each transfer thyristor T.

An image forming apparatus 1 and so on according to the fourth exemplary embodiment are similar to those in the first exemplary embodiment. In the following, different portions are described, whereas similar portions are not repeatedly described.

Figure 9:
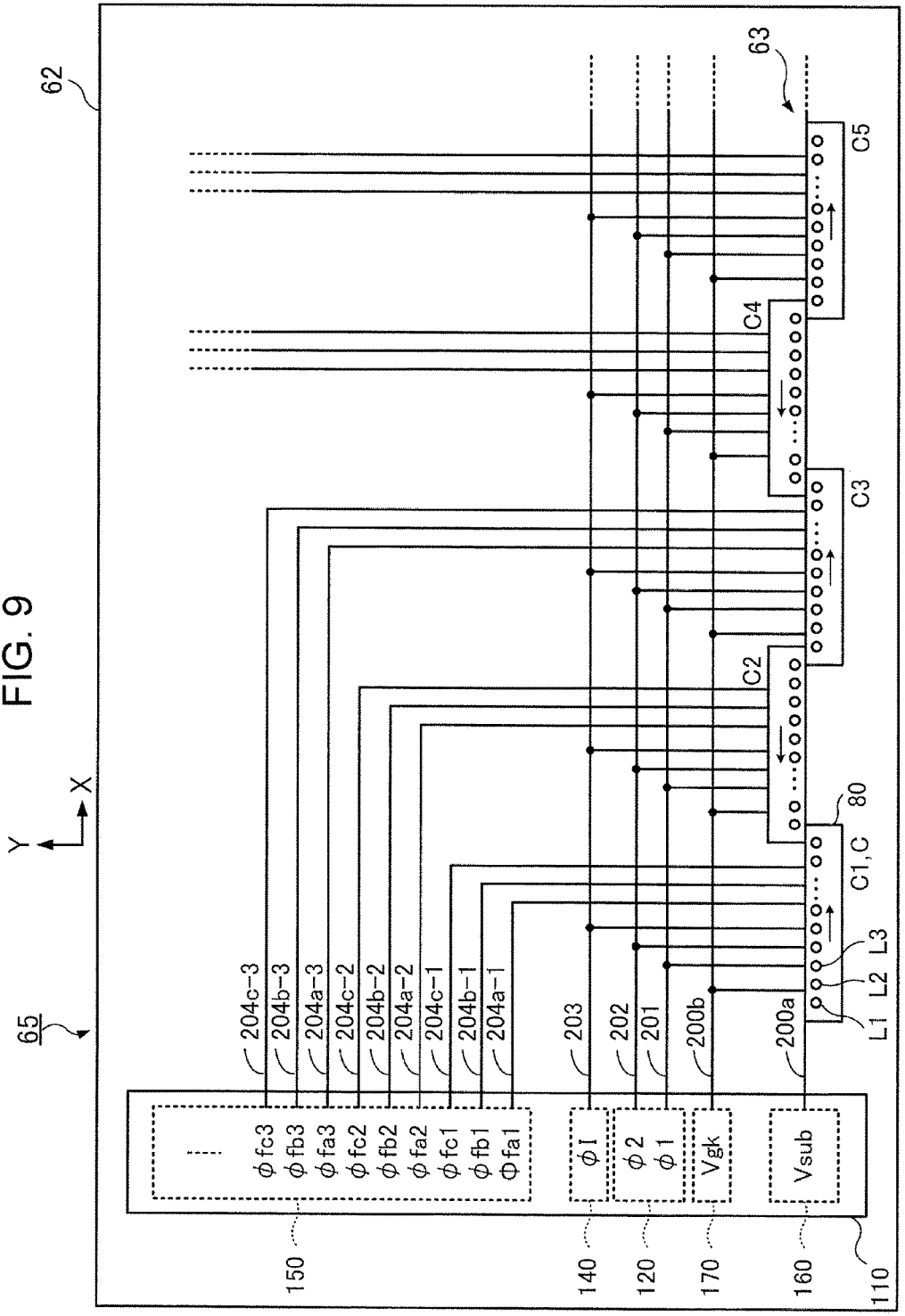
FIG. 9 is a top view of an exemplary light-emitting device according to a fourth exemplary embodiment.

FIG. 9 is a top view of an exemplary light-emitting device 65 according to the fourth exemplary embodiment.

As in the top view of the light-emitting device 65 according to the first exemplary embodiment illustrated in FIG. 3, the light-emitting device 65 includes a light source unit 63 including light-emitting chips C1, C2, C3, etc., which are arranged in a staggered fashion on a circuit board 62, and a signal generation circuit 110 that drives the light source unit 63.

A setting signal generation unit 150 in the signal generation circuit 110 according to the fourth exemplary embodiment transmits setting signals ϕfa1, ϕfb1, and ϕfc1 via setting signal lines 204a-1, 204b-1, and 204c-1, respectively, to set the respective light-emitting thyristors L on the light-emitting chip C1 to the illuminated state/non-illuminated state on the basis of an illumination control signal. The setting signal generation unit 150 further transmits setting signals ϕfa2, ϕfb2, and ϕfc2 via setting signal lines 204a-2, 204b-2, and 204c-2, respectively, to set the respective light-emitting thyristors L on the light-emitting chip C2 to the illuminated state/non-illuminated state. The same applies to the other light-emitting chips C.

The setting signals ϕfa1, ϕfa2, ϕfa3, etc. are referred to collectively as the setting signals ϕfa or individually as a setting signal ϕfa unless they are individually identified. The setting signals ϕfb1, ϕfb2, ϕfb3, etc. are referred to collectively as the setting signals ϕfb or individually as a setting signal ϕfb unless they are individually identified. The setting signals ϕfc1, ϕfc2, ϕfc3, etc. are referred to collectively as the setting signals ϕfc or individually as a setting signal ϕfc unless they are individually identified. In addition, the setting signals ϕfa, ϕfb, and ϕfc are referred to collectively as the setting signals ϕf or individually as a setting signal ϕf unless they are individually identified.

Figure 10:
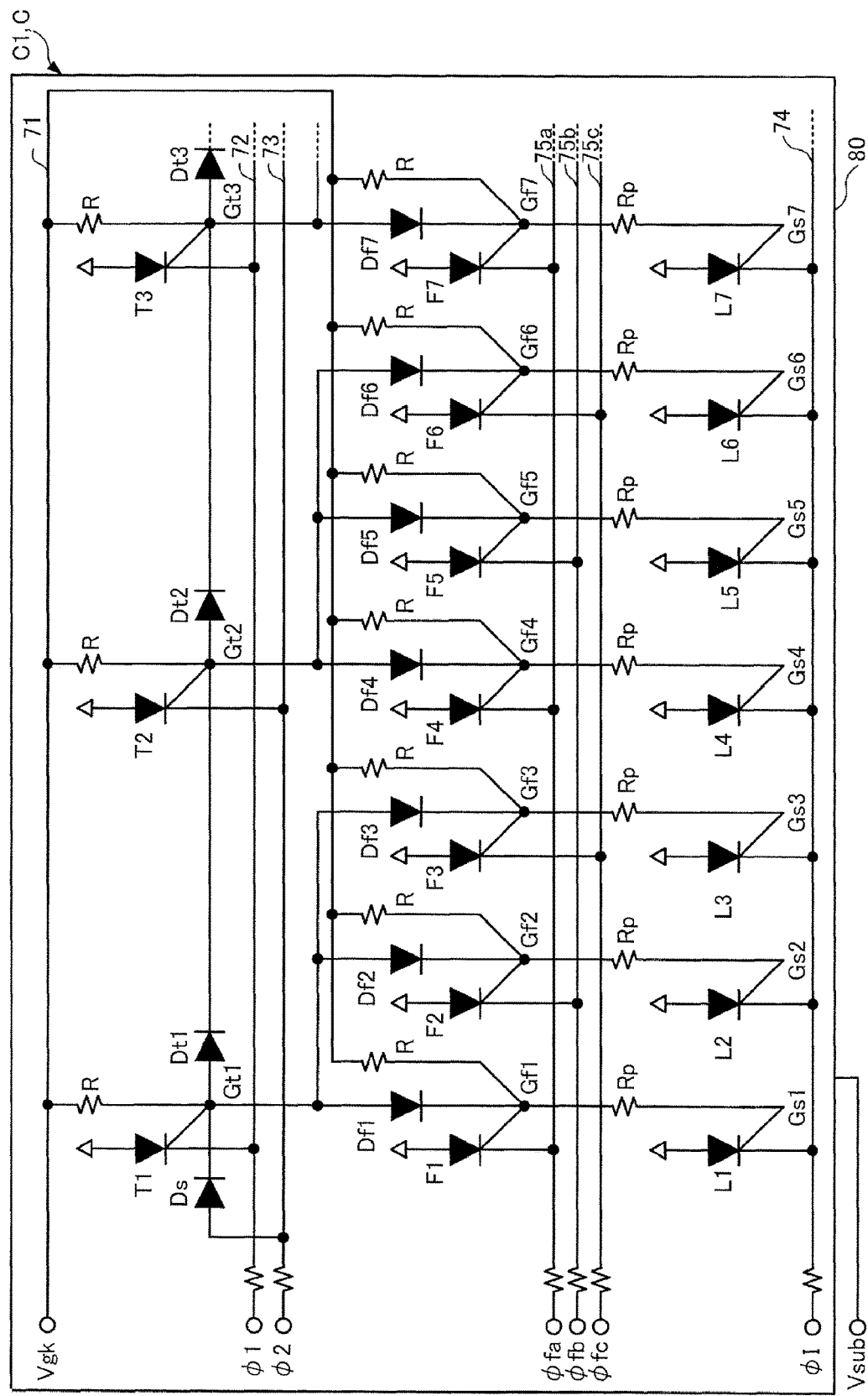
FIG. 10 is an equivalent circuit diagram illustrating a circuit configuration of a light-emitting chip having an SLED array according to the fourth exemplary embodiment.

In the illustrated example, three setting signals ϕf (i.e., the setting signals ϕfa, ϕfb, and ϕfc) are provided for each light-emitting chip C. This is because, as illustrated in FIG. 10 described below, three setting thyristors F and three light-emitting thyristors L are connected to each transfer thyristor T. Thus, the number of setting signals ϕf may be set in accordance with the number of setting thyristors F and the number of light-emitting thyristors L connected to each transfer thyristor T.

FIG. 10 is an equivalent circuit diagram illustrating a circuit configuration of a light-emitting chip C having an SLED array according to the fourth exemplary embodiment.

In a light-emitting chip C1(C) illustrated in FIG. 10, unlike the light-emitting chip C1(C) according to the first exemplary embodiment illustrated in FIG. 4, three setting thyristors F and three light-emitting thyristors L are connected to each transfer thyristor T. Thus, the same or substantially the same portions are given the same numerals and are not described repeatedly, whereas a different portion, namely, a connection relationship between the transfer thyristors T and the setting thyristors F, is described. It is assumed that the light-emitting chip C1(C) includes, for example, 126 light-emitting thyristors L, the number of which is a multiple of 3.

The light-emitting chip C1(C) includes setting signal lines 75a, 75b, and 75c instead of the setting signal line 75 in the light-emitting chip C1(C) according to the first exemplary embodiment illustrated in FIG. 4.

The gate Gt1 of the transfer thyristor T1 is connected in parallel to the respective gates Gf1, Gf2, and Gf3 of the setting thyristors F1, F2, and F3 via the connection diodes Df1, Df2, and Df3, respectively. Also, the gate Gt2 of the transfer thyristor T2 is connected in parallel to the respective gates Gf4, Gf5, and Gf6 of the setting thyristors F4, F5, and F6 via connection diodes Df4, Df5, and Df6, respectively. Although not illustrated in FIG. 10, connection relationships between the other transfer thyristors T and the other setting thyristors F are the same or substantially the same as that described above.

The respective cathodes of the setting thyristors F1, F4, F7, etc. are connected to the setting signal line 75a. The setting signal line 75a is connected to a ϕfa terminal. In the case of the light-emitting chip C1, the ϕfa terminal is connected to the setting signal line 204a-1 illustrated in FIG. 9, and the setting signal ϕfa1 is transmitted from the setting signal generation unit 150.

The respective cathodes of the setting thyristors F2, F5, etc. are connected to the setting signal line 75b. The setting signal line 75b is connected a ϕfb terminal. In the case of the light-emitting chip C1, the ϕfb terminal is connected to the setting signal line 204b-1 illustrated in FIG. 9, and the setting signal ϕfb1 is transmitted from the setting signal generation unit 150.

The respective cathodes of the setting thyristors F3, F6, etc. are connected to the setting signal line 75c. The setting signal line 75c is connected to a ϕfc terminal. In the case of the light-emitting chip C1, the ϕfc terminal is connected to the setting signal line 204c-1 illustrated in FIG. 9, and the setting signal ϕfc1 is transmitted from the setting signal generation unit 150.

That is, the cathodes of the setting thyristors F are connected to the setting signal lines 75a, 75b, and 75c to cyclically change the number.

The connection relationship between the setting thyristors F and the light-emitting thyristors L is similar to that in the first exemplary embodiment.

In the first exemplary embodiment, each transfer thyristor T is connected to a single setting thyristor F. Thus, when a transfer thyristor T enters the on state, the corresponding one of the setting thyristors F is allowed to change from the off state to the on state. When the setting thyristor F turns on and changes from the off state to the on state, the light-emitting thyristor L connected to and assigned the same number as that assigned to the setting thyristor F turns on and changes from the off state (non-illuminated state) to the on state (illuminated state).

In the fourth exemplary embodiment, in contrast, each transfer thyristor T is connected to three setting thyristors F. Thus, when a transfer thyristor T enters the on state, three setting thyristors F are allowed to change from the off state to the on state. When any one of the three setting thyristors F turns on and changes from the off state to the on state, the light-emitting thyristor L connected to and assigned the same number as that assigned to the setting thyristor F turns on and changes from the off state (non-illuminated state) to the on state (illuminated state).

As described above, it is assumed that three setting thyristors F and three light-emitting thyristors L are connected to each transfer thyristor T. The number of setting thyristors F and the number of light-emitting thyristors L connected to each transfer thyristor T may be a value other than three.

Figure 11:
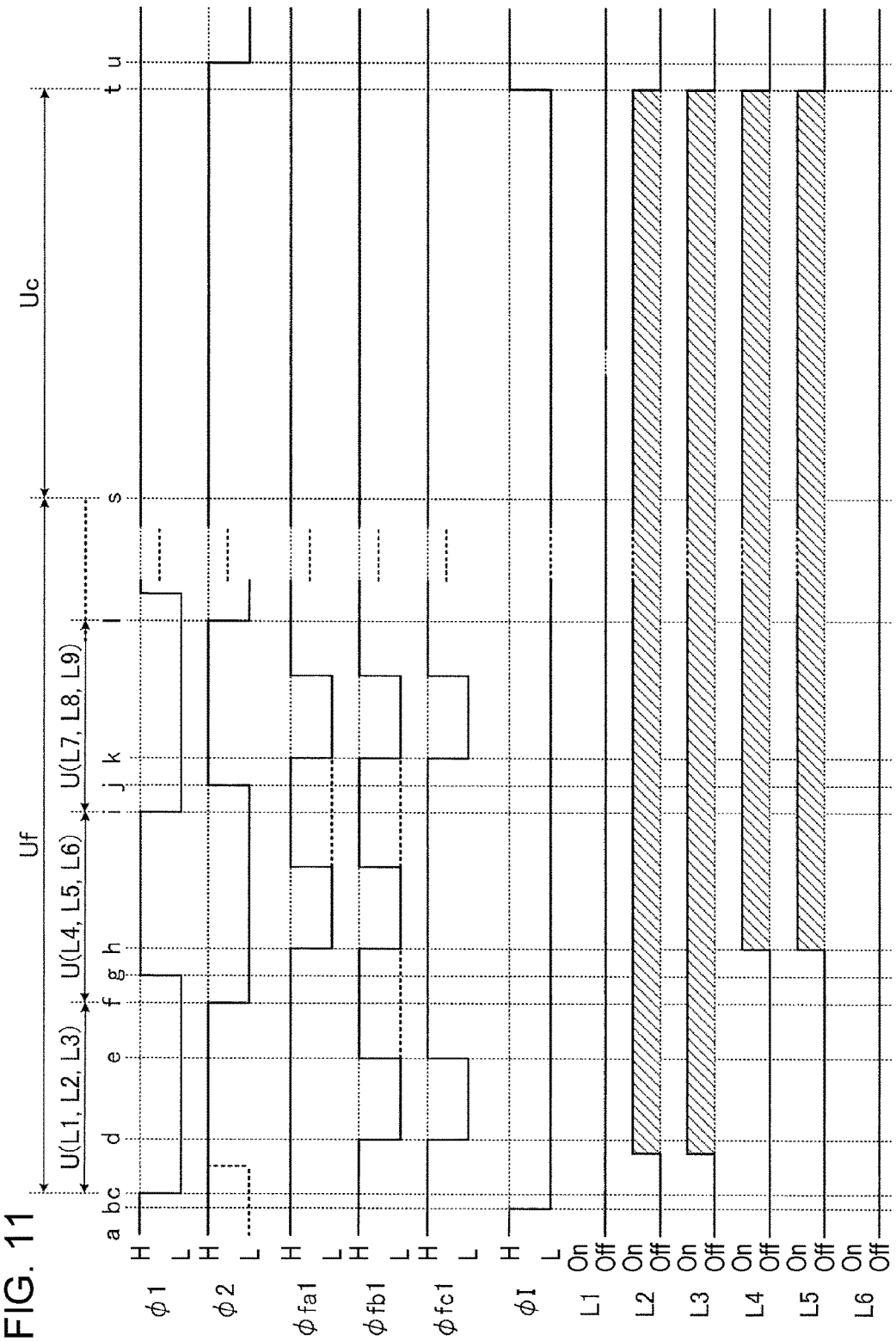
FIG. 11 is a timing chart illustrating the operation of the light-emitting chip according to the fourth exemplary embodiment.

FIG. 11 is a timing chart illustrating the operation of the light-emitting chip C according to the fourth exemplary embodiment.

In the timing chart illustrated in FIG. 11, time passes in alphabetical order (in the order of times a, b, c, etc.). In FIG.

11, times a, b, c, etc. are assumed to be the same as times a, b, c, etc. illustrated in FIG. 5.

A period U(L1, L2, L3) (the period from time c to time f) is a period during which the light-emitting thyristors L1, L2, and L3 are set to either the illuminated state or the non-illuminated state. A period U(L4, L5, L6) (the period from time f to time i) is a period during which the light-emitting thyristors L4, L5, and L6 are set to either the illuminated state or the non-illuminated state. A period U(L7, L8, L9) (the period from time i to time l) is a period during which the light-emitting thyristors L7, L8, and L9 are set to either the illuminated state or the non-illuminated state. Also, the other light-emitting thyristors L on the light-emitting chip C1(C) are set to either the illuminated state or the non-illuminated state in a similar way during the period from time l to time s. An illumination setting period Uf starts at time c and ends at time s.

A continuous illumination period Uc starts at time s and ends at time t.

Referring to the timing chart illustrated in FIG. 11, portions of the operation of the light-emitting chip C1(C) similar to those with reference to the timing chart illustrated in FIG. 5 are not described herein but different portions are described.

It is assumed here that, of the light-emitting thyristors L1 to L9, the light-emitting thyristors L1 and L6 are in the non-illuminated state and the light-emitting thyristors L2 to L5 and L7 to L9 are in the illuminated state.

The operation during the period from time a to time c is similar to that in the first exemplary embodiment illustrated in FIG. 5.

At time d in the period U(L1, L2, L3) (the period from time c to time f), the setting signals ϕfb1 and ϕfc1 are changed from "H" (0 V) to "L" (−3.3 V). Accordingly, the setting signal line 75b to which the setting thyristor F2 is connected and the setting signal line 75c to which the setting thyristor F3 is connected are changed from "H" (0 V) to "L" (−3.3 V). Thus, the setting thyristors F2 and F3 turn on and change from the off state to the on state. Then, the light-emitting thyristor L2, which is connected to the setting thyristor F2, and the light-emitting thyristor L3, which is connected to the setting thyristor F3, turn on and change from the off state (non-illuminated state) to the on state (illuminated state). Since the setting signal ϕfa1 is maintained at "H" (0 V), the setting thyristor F1 does not turn on. Thus, the light-emitting thyristor L1 does not turn on and remains in the non-illuminated state.

Then, at time h in the period U(L4, L5, L6) (the period from time f to time i), the setting signals ϕfa1 and ϕfb1 are changed from "H" (0 V) to "L" (−3.3 V). Then, as in the period U(L1, L2, L3), the light-emitting thyristors L4 and L5 change to the on state (illuminated state). Since the setting signal ϕfc1 is maintained at "H" (0 V), the setting thyristor F6 does not turn on. Thus, the light-emitting thyristor L6 does not turn on and remains in the non-illuminated state.

Then, at time k in the period U(L7, L8, L9) (the period from time i to time l), the setting signals ϕfa1, ϕfb1, and ϕfc1 are changed from "H" (0 V) to "L" (−3.3 V). Then, the light-emitting thyristors L7, L8, and L9 change to the on state (illuminated state). In FIG. 11, the on/off indication of the light-emitting thyristors L7, L8, and L9 is omitted.

The other light-emitting thyristors L are also set to either the illuminated state or the non-illuminated state in a similar way.

As described above, the setting signals ϕfa, ϕfb, and ϕfc are provided to set three light-emitting thyristors L in every group (the light-emitting thyristors L1 to L3, L4 to L6, L7 to L9, etc.) to either the illuminated state or the non-illuminated state in parallel.

Accordingly, multiple light-emitting thyristors L undergo illumination control in parallel, which enables an improvement in effective operation speed (effective speed) even when the operation speed of the transfer thyristors T, the setting thyristors F, and the light-emitting thyristors L is difficult to increase.

When the setting signal ϕfb1 is in "L" (−3.3 V) over consecutive periods U, such as the period U(L1, L2, L3) to the period U(L7, L8, L9) for the setting signal ϕfb1 illustrated in FIG. 11, the setting signal ϕfb1 may be maintained at "L" (−3.3 V) without being returned to "H" (0 V). That is, non-return-to-zero (NRZ) may be used. The same applies to the period U(L4, L5, L6) and the period U(L7, L8, L9) for the setting signal ϕfa1. In FIG. 11, portions for the setting signals ϕfa1 and ϕfb1 where NRZ may be used are indicated by broken lines.

Fifth Exemplary Embodiment

In the fourth exemplary embodiment, as in the first exemplary embodiment, the amount of light of the light-emitting thyristors L is represented as "1/0" and represents no gradation level.

In a fifth exemplary embodiment, as in the second exemplary embodiment, each of the light-emitting thyristors L is controlled to have gradation levels.

An image forming apparatus 1, a light-emitting device 65, and so on according to the fifth exemplary embodiment are similar to those in the first exemplary embodiment. In the following, different portions are described, whereas similar portions are not repeatedly described.

Figure 12:
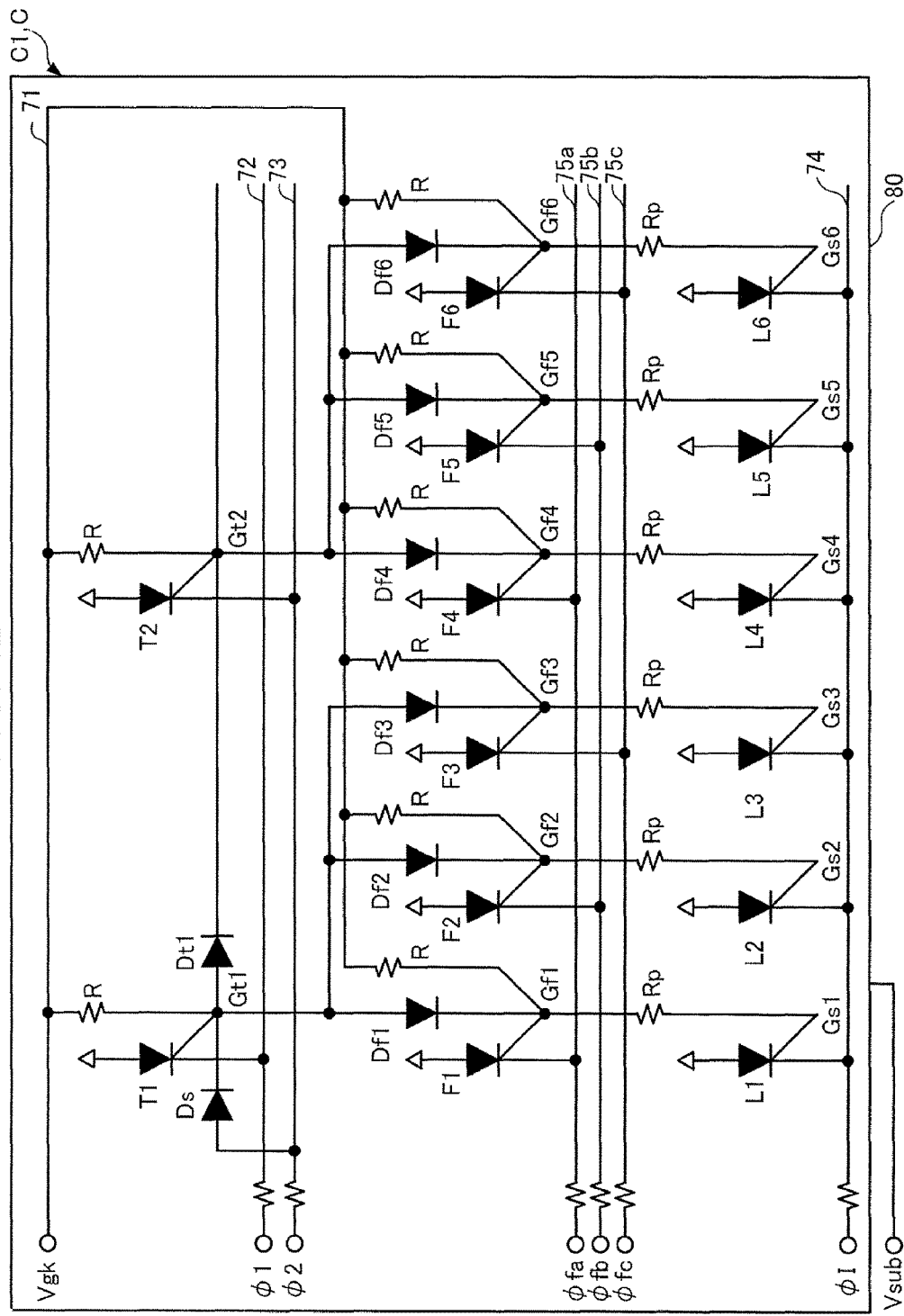
FIG. 12 is an equivalent circuit diagram illustrating a circuit configuration of a light-emitting chip having an SLED array according to a fifth exemplary embodiment.

FIG. 12 is an equivalent circuit diagram illustrating a circuit configuration of a light-emitting chip C having an SLED array according to the fifth exemplary embodiment.

For convenience of description, each of the light-emitting chips C illustrated in FIG. 12 is assumed to include six light-emitting thyristors L, by way of example. It is also assumed that each transfer thyristor T is connected to three setting thyristors F. It should be noted that each setting thyristor F is connected to a single light-emitting thyristor L. Therefore, the light-emitting chip C includes two transfer thyristors, namely, transfer thyristors T1 and T2.

The light-emitting chip C will now be described, taking the light-emitting chip C1 as an example in terms of the relationship with the setting signals ϕf (the setting signals ϕfa1, ϕfb1, and ϕfc1). In the following, the light-emitting chip C is represented by the light-emitting chip C1(C), which is equivalent to "C1, C" in FIG. 12.

In the light-emitting chip C1(C), unlike the light-emitting chip C1(C) according to the fourth exemplary embodiment illustrated in FIG. 10, the number of transfer thyristors T is two. Thus, the same or substantially the same portions are given the same numerals and are not described repeatedly.

Figure 13:
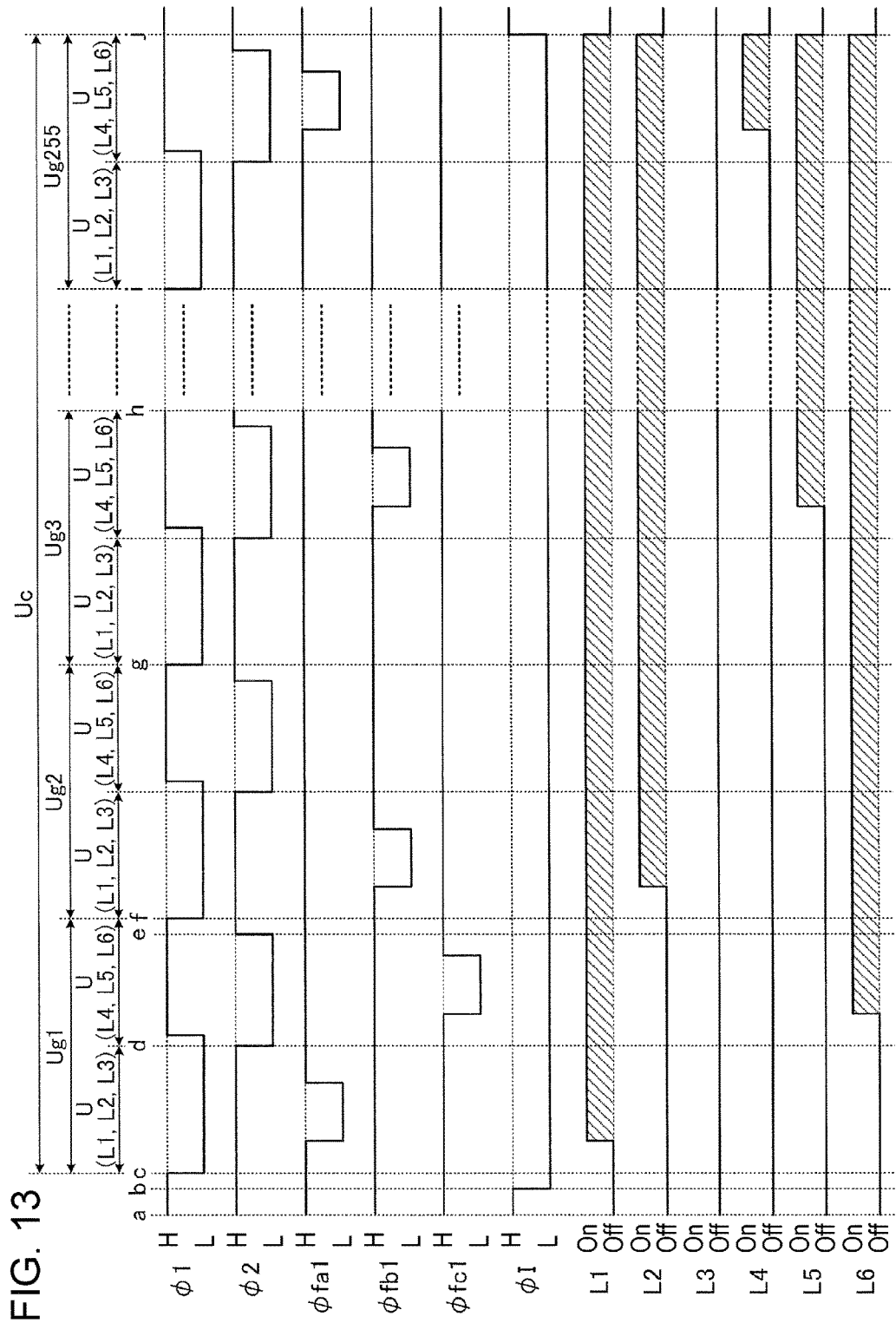
FIG. 13 is a timing chart illustrating the operation of the light-emitting chip according to the fifth exemplary embodiment.

FIG. 13 is a timing chart illustrating the operation of a light-emitting chip C according to the fifth exemplary embodiment.

In the timing chart illustrated in FIG. 13, time passes in alphabetical order (in the order of times a, b, c, etc.). In FIG. 13, times a, b, c, etc. are different from times a, b, c, etc. illustrated in FIG. 5, 7, 8, or 11.

It is assumed here that the light-emitting chip C1(C) illustrated in FIG. 12 achieves 256 gradation levels. That is, to realize 256 gradation levels, the continuous illumination period Uc over which the illuminated state is continuously maintained is divided into 255 periods to obtain gradation setting periods Ug1, Ug2, Ug3, . . . , and Ug255 in which gradation levels are set. The gradation setting periods Ug1, Ug2, Ug3, . . . , and Ug255 are referred to collectively as the gradation setting periods Ug or individually as a gradation setting period Ug unless they are individually identified. Each of the gradation setting periods Ug includes a period U(L1, L2, L3) in which the light-emitting thyristors L1 to L3 are set to either the illuminated state or the non-illuminated state and a period U(L4, L5, L6) in which the light-emitting thyristors L4 to L6 are set to either the illuminated state or the non-illuminated state. The period U(L1, L2, L3) and the period U(L4, L5, L6) are referred to collectively as the periods U or individually as a period U unless they are individually identified.

The gradation setting period Ug1 starts at time c and ends at time f, the gradation setting period Ug2 starts at time f and ends at time g, the gradation setting period Ug3 starts at time g and ends at time h, and the gradation setting period Ug255 starts at time i and ends at time j. The gradation setting periods Ug4 to Ug254 are included between the gradation setting period Ug3 and the gradation setting period Ug255. The continuous illumination period Uc starts at time c and ends at time j.

In the gradation setting period Ug1, the period U(L1, L2, L3) in which the light-emitting thyristors L1, L2, and L3 are set to either the illuminated state or the non-illuminated state starts at time c and ends at time d, and the period U(L4, L5, L6) in which the light-emitting thyristors L4, L5, and L6 are set to either the illuminated state or the non-illuminated state starts at time d and ends at time f. Each of the gradation setting periods Ug2 to Ug255 also includes the period U(L1, L2, L3) in which the light-emitting thyristors L1, L2, and L3 are set to either the illuminated state or the non-illuminated state and the period U(L4, L5, L6) in which the light-emitting thyristors L4, L5, and L6 are set to either the illuminated state or the non-illuminated state.

As an example, the light-emitting thyristor L1 is in the illuminated state over 255 periods out of the 255 gradation setting periods Ug (gradation level 255). The light-emitting thyristor L2 is in the illuminated state over 254 periods out of the 255 gradation setting periods Ug (gradation level 254). The light-emitting thyristor L3 is maintained in the non-illuminated state (gradation level 0). The light-emitting thyristor L4 is in the illuminated state over one period out of the 255 gradation setting periods Ug (gradation level 1). The light-emitting thyristor L5 is in the illuminated state over 253 periods out of the 255 gradation setting periods Ug (gradation level 253). The light-emitting thyristor L6 is in the illuminated state over 255 periods out of the 255 gradation setting periods Ug (gradation level 255).

That is, each of the light-emitting thyristors L1 to L6 is set to either the illuminated state or the non-illuminated state in any of the 255 gradation setting periods Ug, thereby achieving 256 gradation levels.

When the period U in which illumination control is performed is 10 ns, each of the gradation setting periods Ug is 20 ns. Then, the continuous illumination period Uc to achieve 256 gradation levels is 5.1 μs, which is 255 times the gradation setting period Ug, namely, 20 ns. The continuous illumination period Uc may be 10.2 μs to achieve 512 gradation levels. If the continuous illumination period Uc can be longer, higher gradation levels may be used.

A description will be given with reference to a timing chart illustrated in FIG. 13.

The operation during the period from time a to time c is the same or substantially the same as that during the period from time a to time c according to the first exemplary embodiment illustrated in FIG. 5.

In the gradation setting period Ug1, the period U(L1, L2, L3) (the period from time c to time d) corresponds to the period U(L1, L2, L3) (the period from time c to time f) according to the fourth exemplary embodiment illustrated in FIG. 11. In the period U(L1, L2, L3) (the period from time c to time d) illustrated in FIG. 13, due to the presence of a period in which the setting signal ϕfa1 changes to "L" (−3.3 V), as described above with reference to FIG. 11, the light-emitting thyristor L1 turns on and changes from the off state (non-illuminated state) to the on state (illuminated state). In contrast, since the setting signals ϕfb1 and ϕfc1 are maintained at "H" (0 V), the light-emitting thyristors L2 and L3 are maintained in the non-illuminated state.

In the gradation setting period Ug1, the period U(L4, L5, L6) (the period from time d to time f) corresponds to the period U(L4, L5, L6) (the period from time f to time i) according to the fourth exemplary embodiment illustrated in FIG. 11. In the period U(L4, L5, L6) (the period from time d to time f) illustrated in FIG. 13, due to the presence of a period in which the setting signal ϕfc1 changes to "L" (−3.3 V), the light-emitting thyristor L6 turns on and changes from the off state (non-illuminated state) to the on state (illuminated state). In contrast, since the setting signals ϕfa1 and ϕfb1 are maintained at "H" (0 V), the light-emitting thyristors L4 and L5 are maintained in the non-illuminated state.

Thus, the light-emitting thyristors L1 and L6 change from the off state (non-illuminated state) to the on state (illuminated state) during the gradation setting period Ug1. The light-emitting thyristors L1 and L6 remain in the illuminated state during the gradation setting periods Ug2 to Ug255. Therefore, the amount of light with gradation level 255 is achieved from the light-emitting thyristors L1 and L6.

At time e prior to time f, the transfer signal ϕ2 changes from "L" (−3.3 V) to "H" (0 V). Accordingly, the transfer thyristor T2 changes from the on state to the off state. That is, both the transfer thyristors T1 and T2 are brought into the off state. Thus, the state at time f is the same or substantially the same as the state at time c.

In the period U(L1, L2, L3) within the gradation setting period Ug2 (time f to time g), due to the presence of a period in which the setting signal ϕfb1 changes to "L" (−3.3 V), the light-emitting thyristor L2 turns on and changes from the off state (non-illuminated state) to the on state (illuminated state). In contrast, since the setting signals ϕfa1 and ϕfc1 are maintained at "H" (0 V), the light-emitting thyristors L2 and L3 are maintained in the non-illuminated state.

In the period U(L4, L5, L6) within the gradation setting period Ug2 (time f to time g), the setting signals ϕfa1, fb1, and fc1 are maintained at "H" (0 V). Thus, the light-emitting thyristors L4 and L5 are maintained in the non-illuminated state.

Thus, the light-emitting thyristor L2 turns on and changes from the off state (non-illuminated state) to the on state (illuminated state) during the gradation setting period Ug2. The light-emitting thyristor L2 remains in the illuminated state during the gradation setting periods Ug3 to Ug255. Therefore, the amount of light with gradation level 254 is achieved from the light-emitting thyristor L2.

Also, the light-emitting thyristor L5 turns on and changes from the off state (non-illuminated state) to the on state (illuminated state) during the gradation setting period Ug3. The light-emitting thyristor L5 remains in the illuminated state during the gradation setting periods Ug4 to Ug255. Therefore, the amount of light with gradation level 253 is achieved from the light-emitting thyristor L5.

Further, the light-emitting thyristor L4 turns on and changes from the off state (non-illuminated state) to the on state (illuminated state) during the gradation setting period Ug255. Therefore, the amount of light with gradation level 1 is achieved from the light-emitting thyristor L4.

The light-emitting thyristor L3 is maintained in the non-illuminated state during the gradation setting periods Ug1 to Ug255. Therefore, the amount of light of the light-emitting thyristor L3 represents gradation level 0.

As described above, the amount of light of the light-emitting thyristor L is controlled to represent 255 gradation levels.

There is a difference in time (in the example described above, 10 ns) between the period U(L1, L2, L3) in which the light-emitting thyristor L1 is set to the illuminated state and the period U(L4, L5, L6) in which the light-emitting thyristor L6 is set to the illuminated state. Due to the presence of the difference in time, the illumination period of the light-emitting thyristor L1 is longer than that of the light-emitting thyristor L6 by 10 ns. However, the difference in illumination period is approximately 0.19% of the continuous illumination period Uc (in the example described above, 5.1 µs) and is therefore negligible.

The same applies to the gradation setting periods Ug2 to Ug255.

The configuration described above allows the image forming apparatus 1 configured to form an image on a recording sheet to form an image having gradation levels by using the amount of light and a projector configured to project and form an image to form an image having gradation levels. In particular, when an image is projected, a screen is easily formed at a speed that makes it less likely to cause flickering or the like.

The values are given in the first to fifth exemplary embodiments for easy understanding of the description and are not to be construed as limiting.

In the first to fifth exemplary embodiments, the light-emitting thyristors L change between the off state (non-illuminated state) and the on state (illuminated state). Alternatively, the light-emitting thyristors L may be controlled to be in a light emission state even in the off state and to increase its light emission intensity (the amount of light (luminous flux) per unit time) when they enter the on state.

In the first to fifth exemplary embodiments, the light-emitting thyristors L are controlled in such a manner as to change from the non-illuminated state to the illuminated state at different timings and to change from the illuminated state to the non-illuminated state at the same timing. Alternatively, the light-emitting thyristors L may have a gate turn-off thyristor (GTO) structure and may be controlled in such a manner as to change from the off state (non-illuminated state) to the on state (illuminated state) at the same timing and to change from the on state (illuminated state) to the off state (non-illuminated state) at different timings.

In the first to fifth exemplary embodiments, the light-emitting chips C are described with the light-emitting thyristors L, the transfer thyristors T, and the setting thyristors F whose anodes are set to a reference potential. Alternatively, the cathodes of the light-emitting thyristors L, the transfer thyristors T, and the setting thyristors F may be set to a reference potential. In this case, the polarity of the circuit is changed.

In the first to fifth exemplary embodiments, the light-emitting chips C are composed of GaAs-based semiconductor, by way of example but not limitation. For example, the light-emitting chips C may be composed of compound semiconductor that makes it difficult to manufacture a p-type semiconductor and an n-type semiconductor by using ion implantation, such as GaP.

In the first to fifth exemplary embodiments, the light-emitting thyristors L are used as an example of light-emitting elements. Instead of the light-emitting thyristors L, light-emitting elements having a non-thyristor structure, such as light-emitting diodes or laser elements, may be used. The term "non-thyristor structure", as used herein, refers to, by way of example, a structure having an anode terminal and a cathode terminal but having no gate terminal. The light-emitting elements may be of a surface-emitting type or an edge-emitting type. When light-emitting elements having a non-thyristor structure are used, a light-emitting element having a non-thyristor structure may be connected in series on the cathode or anode side of each of the light-emitting thyristors L illustrated in FIG. 4 and each of the light-emitting thyristors L may function as a thyristor (driving thyristor) for driving the corresponding light-emitting element. Further, the value of the resistors Rp may be changed or a new diode may be added so that the anode of the diode is connected between the gate Gf and the gate Gs in such a manner as to be positioned on the gate Gf side, for example, to adjust the gate voltage of the light-emitting thyristor L (driving thyristor) to an appropriate value. When a new diode is added, a resistor may be connected between the gate Gf and the power supply potential Vgk to stabilize the operation. With the configuration described above, for example, a laser element having high light emission intensity is available as a light-emitting element.

In a configuration in which light-emitting elements and driving thyristors are connected in series, the light-emitting elements may be composed of compound semiconductor such as GaAs, GaN, or InP, the other elements such as the transfer thyristors, and the setting thyristors, and the driving thyristors may be composed of silicon semiconductor, with the light-emitting elements and the other elements being integrated using bonding or the like.

In the first to fifth exemplary embodiments, thyristors are used as an example of setting elements. The setting elements are not limited to thyristors, and may be constituted by other functional elements such as transistors. The coupling diodes Dt and the connection diodes Df described with reference to FIG. 4 may also be constituted by other functional elements such as transistors.

In the second exemplary embodiment, the light-emitting thyristors L may have unique variations in the amount of light. In this case, the timing of starting light emission (the gradation setting period Ug) may be adjusted for each of the light-emitting thyristors L to achieve the desired amount of light (gradation). For example, when the unique amount of light produced by the light-emitting thyristor L2 is larger than that of the other light-emitting thyristors, it is desirable that the gradation setting period Ug in which the light-emitting thyristor L2 emits light be set later. As an example, the timing at which the light-emitting thyristor L2 is caused to emit light, which would otherwise be the gradation setting period Ug1, may be delayed and the light-emitting thyristor L2 may be caused to emit light in the gradation setting period Ug2, for example.

In addition, the transfer elements may stop their transfer operation during a gradation setting period Ug in which none of the light-emitting thyristors L is set to the illuminated state (i.e., none of the light-emitting thyristors L starts light emission). As an example, in FIG. 7, the transfer operation may be stopped during the gradation setting periods Ug2, Ug3, and Ug5 to Ug254. Although the gradation setting periods Ug5 to Ug254 are not depicted in FIG. 7, the gradation setting periods Ug5 to Ug254 are included between the gradation setting period Ug4 and the gradation setting period Ug255 and are similar to the gradation setting periods Ug2 and Ug3. The transfer operation may be stopped by setting the transfer signals $\phi1$ and $\phi2$ to "H" (0 V) and maintaining the transfer signals $\phi1$ and $\phi2$ in "H". Additionally, after the illumination of the light-emitting thyristor L2 is turned on in the gradation setting period Ug1, the transfer operation may also be stopped during the periods U(L3) and U(L4). The transfer operation is stopped, thereby reducing the power consumption, compared with when the transfer operation is not stopped.

In the first to fifth exemplary embodiments, a light-emitting device is used in an image forming apparatus. A light-emitting device may be used as a light source that performs operations such as recognizing the shape of an object and measuring a distance. In this case, a scanning unit that scans light emitted from the light-emitting device in a row in a direction intersecting the row may be provided. That is, a light irradiation apparatus may be configured such that light beams emitted from the light-emitting device in a continuous manner in the main scanning direction on the basis of illumination control signals are scanned in a sub-scanning direction intersecting the row to apply light two-dimensionally. Examples of the scanning unit include a polygon mirror and a micro-electromechanical systems (MEMS) mirror.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A light-emitting device comprising:
a plurality of transfer elements that sequentially enter an on state;
a plurality of setting elements connected to the plurality of transfer elements, the plurality of setting elements being allowed to enter an on state in response to the plurality of transfer elements entering the on state;
a plurality of light-emitting elements each connected to a corresponding one of the plurality of setting elements, each of the plurality of light-emitting elements entering an on state to emit light or increase a light emission intensity thereof in response to the corresponding one of the plurality of setting elements entering the on state, the plurality of light-emitting elements being maintained in the on state in parallel; and
a controller that controls the plurality of setting elements to enter the on state in accordance with a received illumination control signal and controls an illumination period of the plurality of light-emitting elements.
2. The light-emitting device according to claim 1, wherein the plurality of setting elements and the plurality of light-emitting elements are each a thyristor.

3. The light-emitting device according to claim 1, further comprising:
a plurality of driving thyristors each connected in series with a corresponding one of the plurality of light-emitting elements and connected to a corresponding one of the plurality of setting elements, each of the plurality of driving thyristors entering an on state to allow the corresponding one of the plurality of light-emitting elements to emit light or increase a light emission intensity thereof in response to the corresponding one of the plurality of setting elements entering the on state,
wherein each of the plurality of light-emitting elements has a non-thyristor structure.
4. The light-emitting device according to claim 1, wherein the controller supplies an illumination signal to the plurality of light-emitting elements to provide current for illumination and controls the illumination period of the plurality of light-emitting elements in accordance with timing of turning off of the illumination signal.
5. The light-emitting device according to claim 4, wherein, after controlling the plurality of setting elements to enter the on state, the controller continuously provides current to the plurality of light-emitting elements for illumination by using the illumination signal within a predetermined period to control the illumination period of the plurality of light-emitting elements.
6. The light-emitting device according to claim 4, wherein the controller modulates the illumination signal in a cycle shorter than the illumination period.
7. The light-emitting device according to claim 1, wherein the controller controls the plurality of setting elements such that two or more target light-emitting elements among the plurality of light-emitting elements are sequentially illuminated in a first period, and controls the illumination period such that the two or more target light-emitting elements that are illuminated in the first period continuously remain illuminated in parallel during a second period subsequent to the first period.
8. The light-emitting device according to claim 7, wherein the controller performs control such that the second period is longer than the first period.
9. The light-emitting device according to claim 7, wherein the controller inhibits at least one of an operation of the plurality of transfer elements or an operation of the plurality of setting elements during the second period.
10. The light-emitting device according to claim 1, wherein the controller controls the illumination period such that an amount of light from each of the plurality of light-emitting elements represents a predetermined gradation level.
11. The light-emitting device according to claim 1, wherein the controller controls each of the plurality of setting elements such that an amount of light from the corresponding one of the plurality of light-emitting elements represents a predetermined gradation level.
12. The light-emitting device according to claim 1, wherein the controller repeatedly performs transfer control a number of times corresponding to the number of gradation levels, the transfer control including causing the plurality of transfer elements to sequentially enter the on state, and controls the plurality of setting elements such that the plurality of light-emitting elements start light emission when the transfer control is repeatedly performed a number of times corresponding to a gradation level to be output.

13. The light-emitting device according to claim 1, wherein each of the plurality of transfer elements is connected to two or more of the plurality of setting elements.

14. An image forming apparatus comprising:
- an image carrier;
- a charging unit that charges the image carrier;
- an exposure unit that exposes the image carrier to light, the exposure unit including the light-emitting device according to claim 1;
- a developing unit that develops an electrostatic latent image formed on the image carrier through exposure to light by the exposure unit to form an image on the image carrier; and
- a transfer unit that transfers the image on the image carrier onto a transfer medium.

15. A light irradiation apparatus comprising:
- the light-emitting device according to claim 1, the plurality of light-emitting elements in the light-emitting device being arranged in a row,
- wherein light beams emitted from the plurality of light-emitting elements are applied two-dimensionally.

16. The light irradiation apparatus according to claim 15, further comprising:
- a scanning unit that scans light emitted from the light-emitting device to form a two-dimensional image based on the illumination control signal.

* * * * *